(12) United States Patent
Ono et al.

(10) Patent No.: US 7,929,435 B2
(45) Date of Patent: Apr. 19, 2011

(54) APPLICATION HANDOVER METHOD FOR MOBILE COMMUNICATIONS SYSTEM, AND MOBILITY MANAGEMENT NODE AND MOBILE NODE USED IN THE MOBILE COMMUNICATIONS SYSTEM

(75) Inventors: Hideaki Ono, Hagi (JP); Keiichi Nakatsugawa, Kawasaki (JP); Yuji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1678 days.

(21) Appl. No.: 11/140,345

(22) Filed: May 27, 2005

(65) Prior Publication Data

US 2006/0002344 A1    Jan. 5, 2006

(51) Int. Cl.
*H04L 12/56* (2006.01)
*H04J 1/16* (2006.01)

(52) U.S. Cl. .................. 370/230; 370/252; 370/254

(58) Field of Classification Search .......... 370/230–235, 370/252, 237, 238, 254, 389, 401, 331; 709/238–242
See application file for complete search history.

(56) References Cited

U.S. PATENT DOCUMENTS

| | | | |
|---|---|---|---|
| 6,400,946 B1 | 6/2002 | Vazvan et al. | |
| 6,628,973 B1 | 9/2003 | Kikuchi | |
| 6,704,295 B1 | 3/2004 | Tari et al. | |
| 6,765,920 B1 | 7/2004 | Tari et al. | |
| 7,006,472 B1 * | 2/2006 | Immonen et al. | 370/332 |
| 7,539,499 B2 * | 5/2009 | Holur et al. | 455/452.2 |
| 2002/0118664 A1 | 8/2002 | Ishibashi et al. | |
| 2006/0256719 A1 * | 11/2006 | Hsu et al. | 370/230 |

FOREIGN PATENT DOCUMENTS

| | | |
|---|---|---|
| JP | 10-327463 | 12/1998 |
| JP | 11-501783 | 2/1999 |
| JP | 2000-138697 | 5/2000 |
| JP | 2000-224652 | 8/2000 |
| JP | 2000-261857 | 9/2000 |
| JP | 2000-307660 | 11/2000 |
| JP | 2000-332642 | 11/2000 |
| JP | 2002-112347 | 4/2002 |
| JP | 2002-252620 | 9/2002 |
| WO | 0041369 | 7/2000 |

OTHER PUBLICATIONS

Notification of Reason(s) for Refusal with translation, dated Aug. 26, 2008, for corresponding Japanese Patent Application JP 2004-572089.
Fujitsu Limited, "Seamless link V1.0", Jan. 27, 2003.
International Search Report dated Sep. 9, 2003.
Seamlesslink V1.0.

* cited by examiner

*Primary Examiner* — John Pezzlo
(74) *Attorney, Agent, or Firm* — Fujitsu Patent Center

(57) ABSTRACT

The present invention relates to a handover technique used in a mobile communications system. For instance, a mobility management node selects an access line to be used for transferring application data, on the basis of the type of application data (http, ftp, voip, or the like) to be transferred from a communication node at the other end to a mobile node, and transfers the application data by means of the selected access line. As a result, a plurality of access lines connected simultaneously to the mobile node can be used according to the type of application, such as http, ftp, voip, or the like. Therefore, the quality desired by a user is ensured, and an attempt to effectively utilize a network can be realized.

20 Claims, 32 Drawing Sheets

LOCATION REGISTRATION MESSAGE
TRANSMISSION PROCESSING DURING MOVEMENT
(ON PER-INTERFACE BASIS)

LOCATION REGISTRATION MESSAGE
TRANSMISSION PROCESSING DURING
voip COMMUNICATION

APPLICATION HANDOVER METHOD FOR MOBILE COMMUNICATIONS SYSTEM, AND MOBILITY MANAGEMENT NODE AND MOBILE NODE USED IN THE MOBILE COMMUNICATIONS SYSTEM

CROSS REFERENCE TO RELATED APPLICATIONS

This application is based on and hereby claims priority to PCT international application No. PCT/JP2003/006252 filed on May 20, 2003 in Japan, the contents of which are hereby incorporated by reference.

BACKGROUND OF THE INVENTION (1) Field of the Invention

The present invention relates to a technique suitable for use in a mobile communications system using a mobile node which enables simultaneous connection to a plurality of access interfaces (access lines) in, e.g., a mobile communication network using a mobile IP (Internet Protocol) for managing maintenance of communication during movement of a mobile terminal (a mobile node) such as a portable cellular phone, a PDA (Personal Digital Assistant), or the like.

(2) Description of the Related Art

In association with recent proliferation of the Internet, communication using an IP has become widespread. A mobile IP which enables mobile communication using an IP is being contemplated by IETF (Internet Engineering Task Force), and mobile communication using a mobile IP is on its way of becoming feasible. The mobile IP is a technique for rendering communication continuous by having registered, in an HA (Home Agent) serving as a mobility management node, a destination address (CoA: Care of Address) showing the current location of the mobile terminal (MN: Mobile Node) even when the MN has moved.

A communication method using a mobile IP will be described hereinbelow by reference to FIG. 35.

First, the MN is assumed to be in connection with a sub-network (local link) subordinate to an access router (AR1). A destination address (CoA) used by the MN in this case is CoA1. When having moved to a link of the AR1, the MN acquires or generates the destination address CoA1 and registers the destination address in a location information cache (BC: Binding Cache) by use of a location registration message (BU: Binding Update). A CN (Correspondent Node) is a counterpart communication node at the other end, and transmits a packet addressed to a home address (HoA: Home of Address) of the MN.

This packet is delivered to the HA. The HA intercepts the packet, encapsulates the packet with the destination address that is obtained as a result of the location information cache of the HA having been referred to or retrieved, and transmits the thus-encapsulated packet. Since the current destination address of the MN is set to CoA1, the encapsulated packet is delivered to the MN. Upon receipt of the packet, the MN unpacks (decapsulates) the encapsulated packet to thus extract the original packet addressed to the HoA, thereby interpreting that the packet is addressed to the HoA of the MN. In this way, the MN enables receipt of a packet at a location to which the MN has moved.

Next, the MN is assumed to have moved further to a link of another access router (a link of an AR2). Then, the MN generates an address CoA2 used by the location to which the MN has moved (the link of the AR2). The MN again registers the destination address CoA2 in the HA by means of a location registration message. As a result, the destination address of the MN registered in the location information cache of the HA is updated from CoA1 to CoA2.

As in the previously-described case, the CN transmits a packet addressed to the home address (HoA) of the MN. This time, the packet is encapsulated with the destination address CoA2 by the HA, and then transferred. The packet encapsulated with the destination address CoA2 is delivered to the MN, and the MN decapsulates the packet, to thus extract the packet addressed to the HoA of the CN. The reason for this is that, since the current packet is addressed to the same destination as that to which the preceding packet is addressed, a higher-layer application can receive a packet from the CN without becoming aware of movement of the MN even when the MN has moved. In this way, even after having moved, the MN can continue communication with the CN without interruption (without interrupting the application) [such switching of a packet transfer path (access line) is called "handover"].

To date, various access networks have been developed and put into practice. Available access networks include an access network using, for example, a third-generation (hereinafter called a "3G") mobile communications network, a second-generation (hereinafter called a "2G") mobile communications network [which is a communication scheme called PDC (Personal Digital Cellular) in Japan or GSM (Global System for Mobile Communications) in Europe], a PHS (Personal Handyphone System), or a wireless LAN (Wireless Local Area Network); or any of various access networks such as an Ethernet (registered trademark) connection employed in businesses, an ADSL (Asymmetric Digital Subscriber Line), or an ISDN (Integrated Services Digital Network). Under these environments, the user can select and use an optimum access network at all times.

For instance, as described in Non-Patent Document 1 provided below, switching is automatically performed so as to be able to connect to an optimum network instantaneously without interrupting communication during usage of a mobile personal computer or the like. When a large-volume attached file is downloaded, high-speed communication, such as wireless LAN, is used. In contrast, a PHS network is used for ordinary communication. Thus, the user can establish communication in the optimum network environment without becoming aware of which one of the networks is in communication with the user.

Techniques described in Patent Documents 1 and 2, which are provided below, are available as another technique of the mobile communications system. A technique described in Patent Document 1 (a multimode general-purpose mobile communications system) is for a case where, in a system into which various mobile communications systems such as satellite mobile communications systems are combined together, a mobile terminal performs handover on the basis of at least one parameter (e.g., cost, capacity, transmission speed, or the degree of usability) in addition to connection quality when determining handover.

As a result, under the technique described in Patent Document 1, the mobile terminal continuously scans an available communications network (circuit switching service, packet switching service, wireless LAN, or the like) during movement. For example, when a communications network available in an area where the mobile terminal is moving offers the same service at lower cost than does the communications network available in the home area during utilization of packet switching data service, connection can be switched to a communications network in the area where the mobile terminal is moving. Information about the cost of service is provided to the mobile terminal by means of, e.g., a common channel.

In contrast, the technique described in Patent Document 2 (a communication setting method and electronic equipment) is for causing a mobile PC (electronic equipment) equipped with radio communication means such as a wireless LAN or Bluetooth (a radio transmission scheme using a 2.4 GHz range) to detect a currently-connectable network (an access point) according to the priority level of a previously-registered radio network setting, and to change connection settings for the detected network [a home/office IP address, mail software settings, network settings of a domestic LAN, or settings of a personally-contracted service provider (ISP)]. As a result, even when a change has arisen in the network environment, switching to a different network environment can be realized by the technique described in Patent Document 2.

Patent Document 1
Published Japanese Translation of PCT Patent Application No. HEI-11-501783
Patent Document 2
JP-2002-252620A
Non-Patent Document
"First in Japan! Middle Ware for Automatically Switching to an Optimum Network "Seamlesslink V1.0" newly released" [online], Fujitsu Ltd. Jan. 27, 2003 [retrieved on Apr. 25, 2003], URL:http://pr.fujitsu.com/jp/news/2003/01/27.html.

However, according to the mobile IP technique, the terminal (MN) always has a single home address (HoA), and only one mobile destination address (CoA) corresponds to the home address. Therefore, selective use of an appropriate one from among a plurality of access lines connected simultaneously to the MN in accordance with a service application, such as http (hyper text transfer protocol), ftp (file transfer protocol), and voip (voice over IP), is impossible.

Specifically, as shown in, e.g., FIG. 36, in a state where the home address HoA and the movement destination address CoA are registered in the HA, the destination of packets addressed to the MN is the home address HoA in any one of the following cases: the case where the MN receives html data by accessing a web (Web) server 100; the case where communication with a CN 200 by means of voip is being established; and the case where a file is downloaded from a file server 300 by means of ftp. The HA encapsulates the packets and transmits the thus-encapsulated packets to only one destination address CoA1 or CoA2 at a single time. Therefore, at a given time the MN can receive the plurality of packets by way of only one access line (can perform a mere uniform handover).

This problem arises similarly under the techniques described in above-described Patent Documents 1 and 2. Specifically, under any of these techniques, the mobile terminal detects a usable (connectable) communications network (access line) in an area to which the mobile terminal has moved, and establishes connection with the detected communications network. However, this connection is also uniformly established for all applications. Eventually, the mobile terminal can inevitably establish communication by way of only one access line at a time. Therefore, even in this case, selective use of an appropriate one from among the plurality of simultaneously-connected access lines in accordance with a service application, such as http, ftp, and voip, is impossible.

The present invention has been conceived in light of the problem set forth and aims at causing a mobile terminal to which a plurality of access lines are simultaneously connected to transfer packets by selecting an optimum access line in accordance with the type (attribute) of a service application (data) to be simultaneously used by the mobile terminal.

SUMMARY OF THE INVENTION

To achieve the object, the present invention is characterized by providing an application handover method for use in a mobile communications system, the system having a mobile node which enables simultaneous communication with a plurality of communication nodes at the other end when simultaneously connected to a plurality of access lines, the method comprising: selecting an access line to be used for transferring application data, on the basis of the type of the application data to be transferred from the communication node at the other end to the mobile node; and transferring the application data by means of the selected access line.

The mobile communications system comprises a mobility management node for managing a data transfer path to the mobile node, and the mobility management node can also identify the type of the application data upon receipt of the application data addressed to the mobile node and select the access line on the basis of a result of identification.

Moreover, the mobile node can also report, to the mobility management node and in accordance with an access line available in a current location, a correlation between information about the type of application data desired to be received by the access line and transfer destination address information for specifying the access line; and the mobility management node can also select the access line on the basis of the correlation reported by the mobile node and the result of identification.

Further, the correspondence between the information about the type of application data and the destination address information may also be managed by the mobility management node or the mobile node.

The mobile node can also generate, as the transfer destination address information and in accordance with the type of the application data, address information (hereinafter called "line address information") about an access line used for receiving the application data in response to a single mobile node identifier assigned by the mobility management node; and report to the mobility management node a set of the line address information and the information about the type of application data.

The mobile node can also identify the type of the application data upon receipt of the application data from the communication node at the other end, and report, to the communication node at the other end, transfer destination address information corresponding to a result of identification; and the communication node at the other end can also transmit subsequent application data addressed to the mobile node to the transfer destination address information reported by the mobile node.

The mobile node can also identify the type of the application data upon receipt of the application data from the communication node at the other end, and report, to the communication node at the other end, transfer destination address information corresponding to a result of identification; and the mobility management node can also transmit subsequent application data, which are received from the communication node at the other end and are addressed to the mobile node, to the transfer destination address information reported by the mobile node.

Further, after having adjusted information about the type of application data by means of which communication is about to be established with the communication node at the other end, the mobile node can also report, to the mobility management node, a set of the information about the type of the application and the line address information.

After having adjusted information about the type of application data by means of which communication is about to be established with the communication node at the other end, the mobile node can also select a mobile node identifier corresponding to the type information and report, to the mobility management node, a set of the mobile node identifier and the line address information.

When having failed to identify the type of application data addressed to the received mobile node, the mobility management node can also select a previously-set default access line from among the access lines.

Moreover, the mobility management node is preferably a node having a home agent function complying with a mobile IP, and the mobile node is preferably a node having a client function complying with the mobile IP.

Next, the present invention is characterized by providing a mobility management node used in a mobile communications system, the system having a mobile node which enables simultaneous communication with a plurality of communication nodes at the other end when simultaneously connected to a plurality of access lines, the mobility management node comprising: data type identification means for identifying the type of application data to be transferred from the communication node at the other end to the mobile node; and access line selection means for selecting, on the basis of a result of identification performed by the data type identification means, an access line used for transferring the application data.

The access line selection means may also comprise address information management means for managing a correspondence between information about the type of the application data and transfer destination address information for specifying an access line used for transferring the application data; and data transfer processing means which determines the transfer destination address information on the basis of the correspondence managed by the address information management means and a result of identification made by the data type identification means and which transfers application data addressed to the mobile node from the communication node at the other end to the transfer destination specified by the transfer destination address information.

The address information management means may have a location information cache for retaining a correspondence between information about the type of application data desired to be received by the access line and transfer destination address information for specifying the access line, the correspondence being reported by the mobile node in accordance with an access line which is available for the mobile node in a current location.

Moreover, the location information cache may also be configured to retain, as the correspondence, a set of address information about an access line used for receiving the application data generated by the mobile node in accordance with the type of the application data in response to a single mobile node identifier and information about the type of the application data reported by mobile node along with the address information. The location information cache may also be configured to retain, as the correspondence, a set of one of mobile node identifiers assigned to the mobile nodes in accordance with the type of the application data and address information about an access line used for receiving the application data.

The access line selection means may have default line selection means for selecting a previously-set default access line when the data type identification means has failed to identify the type of received application data addressed to the mobile node.

The present invention may also be characterized by providing a mobile node used in a mobile communications system, the system having the mobile node which enables simultaneous communication with a plurality of communication nodes at the other end when simultaneously connected to a plurality of access lines, and a mobility management node for managing a path for transferring data to the mobile node, the mobile node comprising: a plurality of line interfaces corresponding to the plurality of access lines; and mobility management means which reports, to the mobility management node in accordance with the type of an access line available in a current location, a correspondence between information about the type of application data received by a line interface corresponding to the access line and transfer destination address information for specifying the access line.

The mobility management means may be configured by comprising application-specific line address information generation means for generating address information (hereinafter called "line address information") about an access line used for receiving the application data in accordance with the type of the application data in response to a single mobile node identifier assigned by the mobility management node; and first transfer destination address information notification means for reporting, to the mobility management node, a set of the line address information and the information about the type of the application data.

The mobility management means may be configured by comprising application-specific node identifier generation means which assigns a plurality of mobile node identifiers in accordance with the type of the application data and which generates, as the transfer destination address information, line address information about an access line used for receiving the application data; and second transfer destination address information notification means for reporting, to the mobility management node, a set of the mobile node identifier and the line address information.

The mobile node may further comprise data type identification means which identifies the type of application data upon receipt of the application data from the mobility management node, and the mobility management means may be configured by comprising first transfer destination address information designation means for reporting, to the communication node at the other end, transfer destination address information corresponding to a result of identification performed by the data identification means such that the communication node at the other end transmits, to the transfer destination specified by the transfer destination address information, subsequent application data addressed to the mobile node.

Moreover, the mobility management means may be configured by comprising second transfer destination address information designation means for reporting, to the mobility management node, transfer destination address information corresponding to a result of identification performed by the data identification means such that the mobility management node transmits, to the transfer destination specified by the transfer destination address information, subsequent application data received from the communication node at the other end.

Further, the mobility management means may comprise type information adjustment means for adjusting type information about application data by means of which communication with the communication node at the other end is about to be started; and the first transfer destination address information notification means may be configured to report, to the mobility management node, a set of the type information having been adjusted by the type information adjustment means and the line address information.

Moreover, the mobility management means may comprise type information adjustment means for adjusting type information about application data by means of which communication with the communication node at the other end is about to be started, and mobile node identifier selection means for selecting a mobile node identifier corresponding to the type information having been adjusted by the type information adjustment means; and the second transfer destination address information notification means may also be configured to report, to the mobility management node, a set of the type information having been adjusted by the type information adjustment means and the line address information.

DESCRIPTION OF THE PREFERRED EMBODIMENTS

Embodiments of the present invention will be described hereinbelow by reference to the drawings.

[A] Description of a First Embodiment

Figure 1:
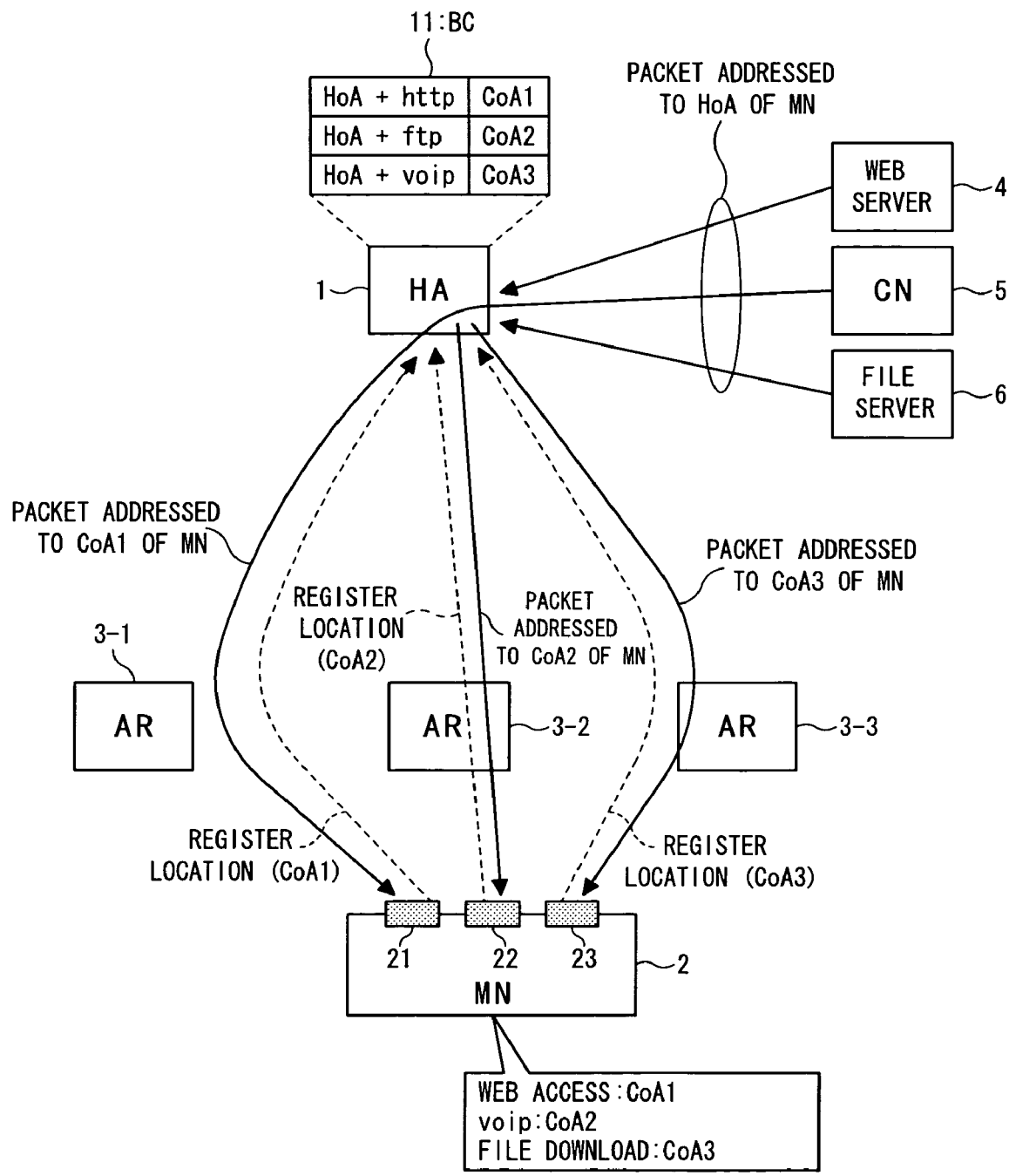
FIG. 1 is a block diagram showing the configuration of a mobile communications system according to a first embodiment of the present invention.

FIG. 1 is a block diagram showing the configuration of a mobile communications system according to a first embodiment of the present invention. The mobile communications system shown in FIG. 1 comprises a home agent node (HA) 1 having a home agent function of Mobile-IPv6 (Mobile-Internet Protocol version 6); a mobile node (MN) 2 having a client function of Mobile-IPv6; routers (access routers: AR) 3-1, 3-2, and 3-3 which can be accessed by the MN2 by means of wireless communication and provided in the Internet (the routers are designated simply as an "AR 3" when they are not distinguished from each other); a web server 4 which offers web service (contents delivery service) to the MN2; a counterpart communication node (CN) 5 with which the MN2 establishes communication through use of a predetermined protocol such as voip or ftp; and a file server 6 for offering file transfer service to the MN2 by means of ftp or the like.

The HA1 has the function of managing current location information [(line address information) address information about an access line which is transfer destination (destination to which the MN2 moves) address information] about the MN2 by means of a location information cache (Binding Cache) 11; encapsulating the packets through use of the latest CoA of the MN2 managed by the location information cache 11 upon receipt of data packets (hereinafter called simply as "packets") addressed to the MN2, which are sent from the web server 4, the CN 5, or the file server 6 to the HA1; and transferring the encapsulated packets to the MN2. Although only one MN2 is shown in FIG. 1, in reality a single HA1 separately manages movement of a plurality of pieces of MN2.

In the embodiment, this HA1 (the location information cache 11) manages the CoA (CoA1, CoA2, and CoA3) of the MN2 for respective line interfaces (hereinafter called simply as "interfaces") 21, 22, and 23 which are provided in accordance with an access line (e.g., a wireless LAN, a PHS, a 3G, a Bluetooth, or the like) with which the MN2 can connect. For each CoA, the HA1 also manages the attribute (type) of a service application (data) (hereinafter called simply an "application"), such as http, ftp, voip, or the like, utilized by the MN2. Specifically, as will be described later, the MN2 of the embodiment can generate the CoA for the respective interfaces 21, 22, and 23 and register the thus-generated CoA in the HA1.

Specifically, information, which is a combination of the home address (a mobile node identifier: HoA) of the MN2 and type information (an attribute code) showing the type of an application such as http, ftp, voip, or the like, is stored as a retrieval key of the location information cache 11 in association with the value of a corresponding CoA. Specifically, this location information cache 11 performs the function of an address information management section which manages a correspondence between an attribute code of application data and transfer destination address information (CoA) for specifying an access line used for transferring the application data.

As a result, when the packet addressed to the MN2 has arrived at the HA1, the HA1 identifies an attribute code by referring to the value of a port number included in a packet header (e.g., 80 for http, 443 for https, 110 for pop3, or the like) of the packet. The HA1 generates a retrieval key by combination of the home address (HoA), which is the destination of the packet, with the identified attribute code, and retrieves the location information cache 11 through use of the retrieval key, to thus acquire a CoA in accordance with the type of the application data addressed to the MN2. Consequently, the HA1 can deliver the packet to a desired MN2 by way of a desired access line corresponding to the type of the application, by means of encapsulating the received packet with the CoA and transferring the thus-encapsulated packet.

Figure 2:
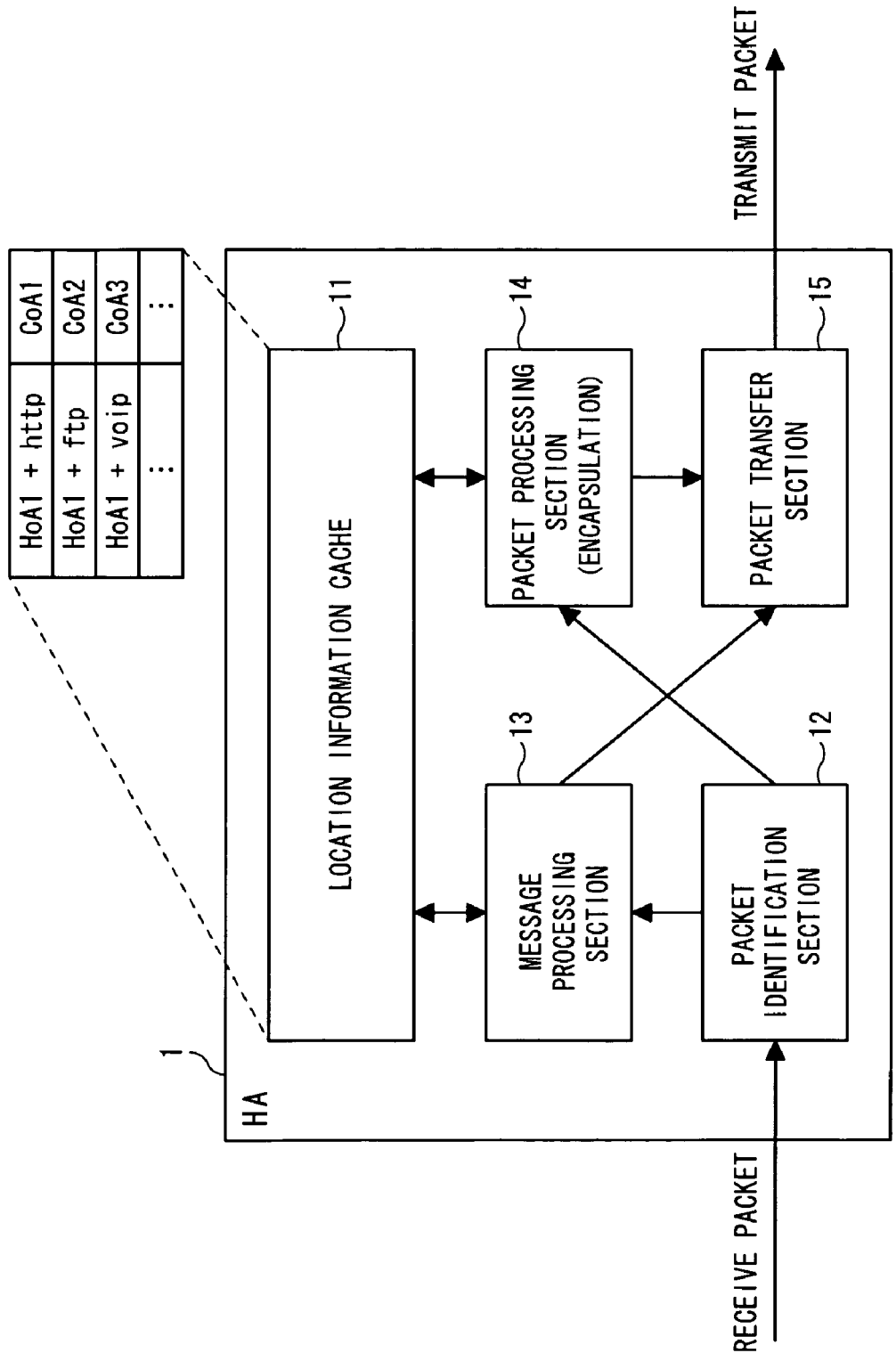
FIG. 2 is a functional block diagram showing the configuration of a home agent node (HA) shown in FIG. 1.

In order to implement such a function, as shown in, e.g., FIG. 2, the HA1 of the embodiment comprises a packet identification section 12, a message processing section 13, a packet processing section 14, and a packet transfer section 15, in addition to including the previously-described location information cache 11.

The packet identification section (the data type identification section) 12 has the function of: analyzing the header of the received packet to thus identify whether or not the received packet is addressed to its own node (the HA1), whether or not the received packet is a control message, such as a location registration message (Binding Update) when the packet is addressed to its own node, and whether or not the packet is a packet addressed to the MN2 (application data); and identifying the application type (a data type) of the received packet from the port number.

When the received packet is identified by the packet identification section 12 as not being addressed to its own node (the HA1), the received packet is transferred in unmodified form to another target node by way of the packet processing section 14 and the packet transfer section 15. When the received packet is identified as a location registration message addressed to its own node, the received packet is passed to the message processing section 13. In contrast, when the received packet is identified as a packet addressed to the MN2, the packet is passed to the packet processing section 14.

The message processing section 13 processes the control message output from the packet identification section 12. If the control message is the location registration message, the message processing section 13 has the function of updating/registering the CoA of the MN2 included in the message into the location information cache 11, or deleting an unnecessary CoA. At this time, registration/updating or deletion of the CoA is performed for each combination of the home address (HoA) of the MN2 and the attribute code identified by the packet identification section 12.

Accordingly, in the present embodiment, the HoA, the CoA, and the application type reflected by (associated with) the CoA are set (specified) by the MN2 in the location registration message transmitted from the MN2. The message processing section 13 registers/updates the CoA in the location information cache 11 in accordance with the thus-set pieces of information.

Specifically, the location information cache 11 retains correspondence between an attribute code of application data—which are reported by the MN2 by means of the location registration message in accordance with an access line available for the MN2 in the current location and which are desired to be received by means of the access line—and transfer destination address information (CoA) for designating the access line.

The packet processing section 14 has the function of: retrieving/determining the CoA of the MN2 matching the application type of the packet by reference to the location information cache 11 upon receipt of the packet addressed to the MN2 from the packet identification section 12; encapsulating the packet with the CoA; and passing the thus-encapsulated packet to the packet transfer section 15. The packet processing section 14 also has the function of a default line selection section which selects a preset default CoA (an access line designated by the CoA) when the packet identification section 12 cannot identify the attribute of the received packet addressed to the MN2.

The packet transfer section 15 has the function of transferring (routing) the packet received from the message processing section 13 and the packet processing section 14 on the basis of a routing table (omitted from the drawings).

More specifically, the packet processing section 14 and the packet transfer section 15 perform the function of a data transfer processing section; that is, the function of determining transfer destination address information (CoA) about the application data on the basis of the correspondence managed by the location information cache 11 and the result of identification performed by the packet identification section 12; and transferring the application data addressed to the MN2 to the transfer destination address information (CoA).

By means of providing the HA1 with the above-described function, the HA1 can determine a CoA for each service application utilized by the MN2, and select an access line to be used for transferring a packet (application data). In short, the location information cache 11, the message processing section 13, the packet processing section 14, and the packet transfer section 15, all of which have been described previously, implement the function of an access line selection section which selects, on the basis of the result of identification of the packet identification section 12, an access line used for transferring application data.

Figure 3:
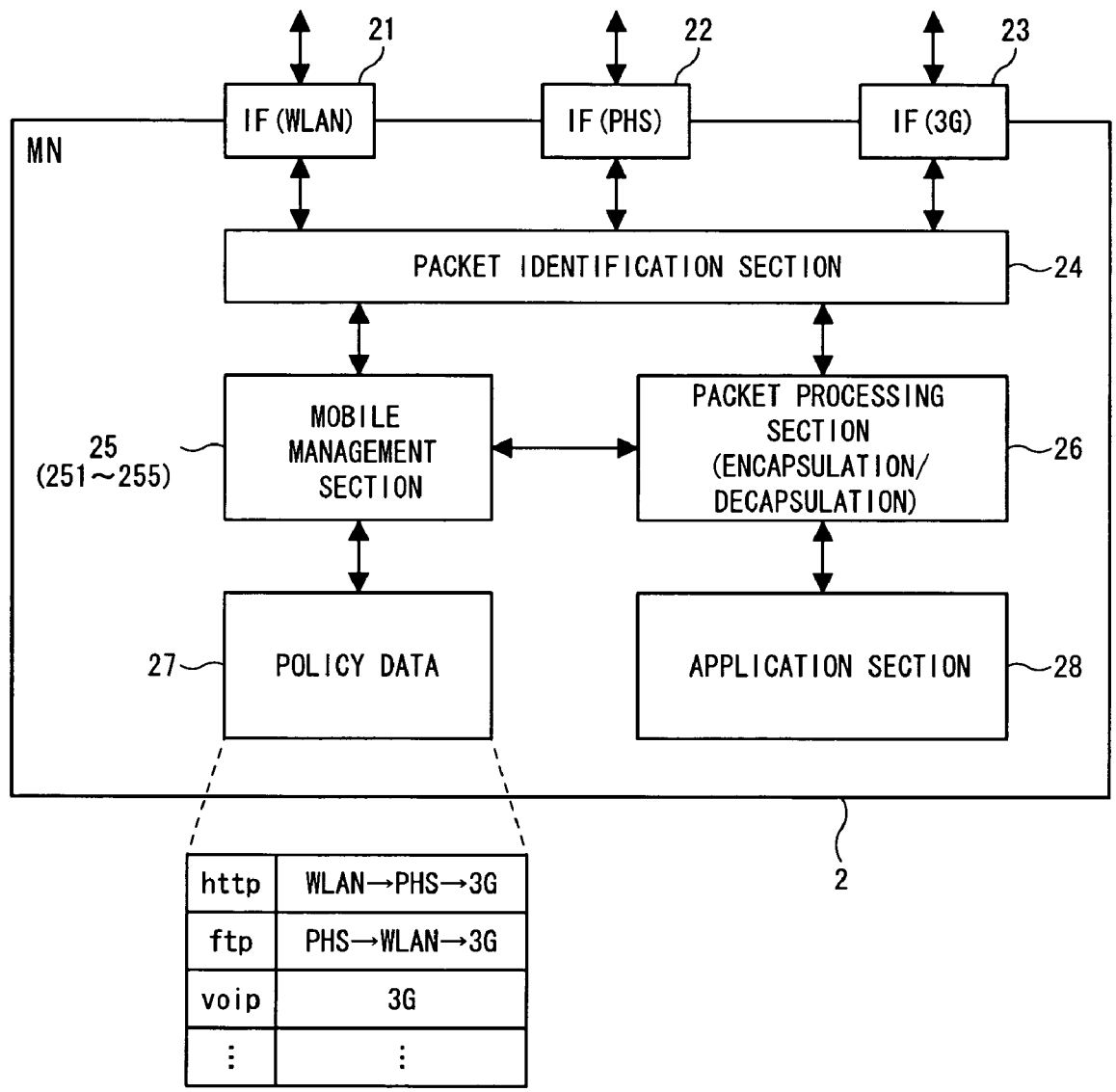
FIG. 3 is a functional block diagram showing the configuration of a mobile node (MN) shown in FIG. 1.

As shown in, e.g., FIG. 3, the MN2 of the present embodiment is configured by comprising a packet identification section 24, a mobility management section 25, a packet processing section 26, policy data memory 27, and an application section 28, in addition to including the previously-described interfaces 21, 22, and 23.

The interfaces 21, 22, and 23 provide an interface with the plurality of access lines (various lines such as a wireless LAN, a PHS, a 3G, a Bluetooth, or the like). For instance, the interface is provided according to the type of an access line utilized by the MN2; for example, the interface 21 is for a wireless LAN (a wireless LAN card); the interface 22 is for a PHS (a PHS card); and the interface 23 is for a 3G (a 3G card).

The packet identification section 24 analyzes the header of a packet received by one of the interfaces 21, 22, and 23, to thus identify the type of the packet. For example, if the received packet is a location management message [a location registration response message output from the HA1 or a router advertisement message (RA: Router Advertisement) or the like output from the AR 3], the received packet is passed to the mobility management section 25, where the packet is processed. If the packet is an application data packet output from the CN 5, the packet is passed to the packet processing section 26, where the packet is processed.

The mobility management section 25 has the function of detecting movement of the MN2 and generating a required location registration message to be transmitted to the HA1. In the present embodiment, the mobility management section 25 also has the following functional sections:

(1) An application-specific CoA generation section (an application-specific line address information generation section) 251 for generating a CoA (CoA1, CoA2, CoA3) of an access line used for receiving the data in accordance with the type of application data in connection with the single home address (HoA) of the MN2 assigned by the HA1

(2) A location registration message issuance section (a first transfer destination address information notification section) 252 which issues a notification to the HA1 by means of causing the location registration message addressed to the HA1 to include a CoA and an attribute code of application data to be received through use of the CoA.

In the case of, e.g., a Mobile-IPv6, each CoA is generated by combining a prefix portion (64 higher-order bits) of the home address and an interface ID unique to each of the interfaces 21, 22, and 23. Specifically, the mobility management section 25 is arranged to register (report), in (to) the HA1, a correspondence between an attribute code of the application data desired to be received by the interface 21, 22, or 23 corresponding to an access line available in the current location of the MN2 and address information (CoA) about the access line, in accordance with the available access line. As a result, the HA1 can register, update, or delete the CoA for each combination of the home address (HoA) of the MN2 and an attribute code, in the manner mentioned previously.

In addition to having the functions set forth, the mobility management section 25 also has the functions of a route optimization section 253, a route changing section 254, and a port number negotiation section 255.

Here, the route optimization section (the first transfer destination address information specifying section) 253 reports (registers), to the CN 5, the CoA corresponding to the identification result of the type of an application made by the packet identification section 12 by means of the location registration message while taking receipt of the packet from the HA1 as a trigger. Thereby, route optimization is performed for causing the CN 5 to transmit subsequent packets addressed to the MN2 directly to the CoA of the MN2 rather than to the HA1 (the home address of the MN2).

The route changing section 254 reports (registers), to the HA 1, the CoA corresponding to the identification result of the type of the application made by the packet identification section 12 by means of the location registration message while taking the receipt of the packet from the HA 1 as a trigger, thereby transmitting, to the CoA, packets which will be received in subsequent operations by the HA 1 from the CN 5 and are addressed to the MN 2. As a result, the MN 2 can change an access line in accordance with the application type of the received packets even after initiation of communication with the CN 5.

The port number negotiation section (type information adjustment section) 255 adjusts a port number to be used, by means of negotiating with the CN 5 about a port number (information about the type of application data for which communication is about to be initiated) used for communication with the same. For example, when the CN 5 is a streaming server, negotiation is performed by means of an RTSP (Real Time Streaming Protocol), thereby acquiring information (play file information, a port number, or the like) required to effect streaming-play of a motion picture. Therefore, in this case, the above-described location registration message issuance section 252 registers (reports) as an attribute code the thus-obtained port number in (to) the HA 1 along with the CoA by means of the location registration message.

Next, the packet processing section 26 has the function of encapsulating the application data packet delivered from the CN 5, and passing the thus-encapsulated packet as data to the application section 28. Further, the packet processing section 26 has the function of encapsulating the transmission data generated by the application section 28, as required, and transmitting the encapsulated packet to the interfaces 21, 22, or 23. The application section 28 has applications of various types, including at least, http, ftp, and voip, in association with the interfaces 21, 22, and 23 provided for the MN 2.

The policy data memory 27 stores policy data used for determining an access line to be used, for each type of application. When the mobility management section 25 generates the location registration message, the CoA to be used is determined for each application type by reference to the policy data, and specifics (an attribute code) of the CoA are included in the location registration message.

For instance, in the embodiment shown in FIG. 3, when the MN 2 utilizes http communication as the policy data the access lines (the interfaces, 21, 22, and 23) are used in a priority sequence of a wireless LAN, a PHS, and a 3G. When ftp is utilized as the policy data, the access lines are used in a priority sequence of a PHS, a wireless LAN, and a 3G. In a case where voip is utilized, policy data showing use of an access line of 3G (the interface 23) are stored in the policy data memory 27. If necessary, the user can change settings of the policy data.

Operation of the mobile communications system of the present embodiment having the above-described configuration will be described in detail hereunder.

(A1) Description of Operation of the HA

Figure 11:
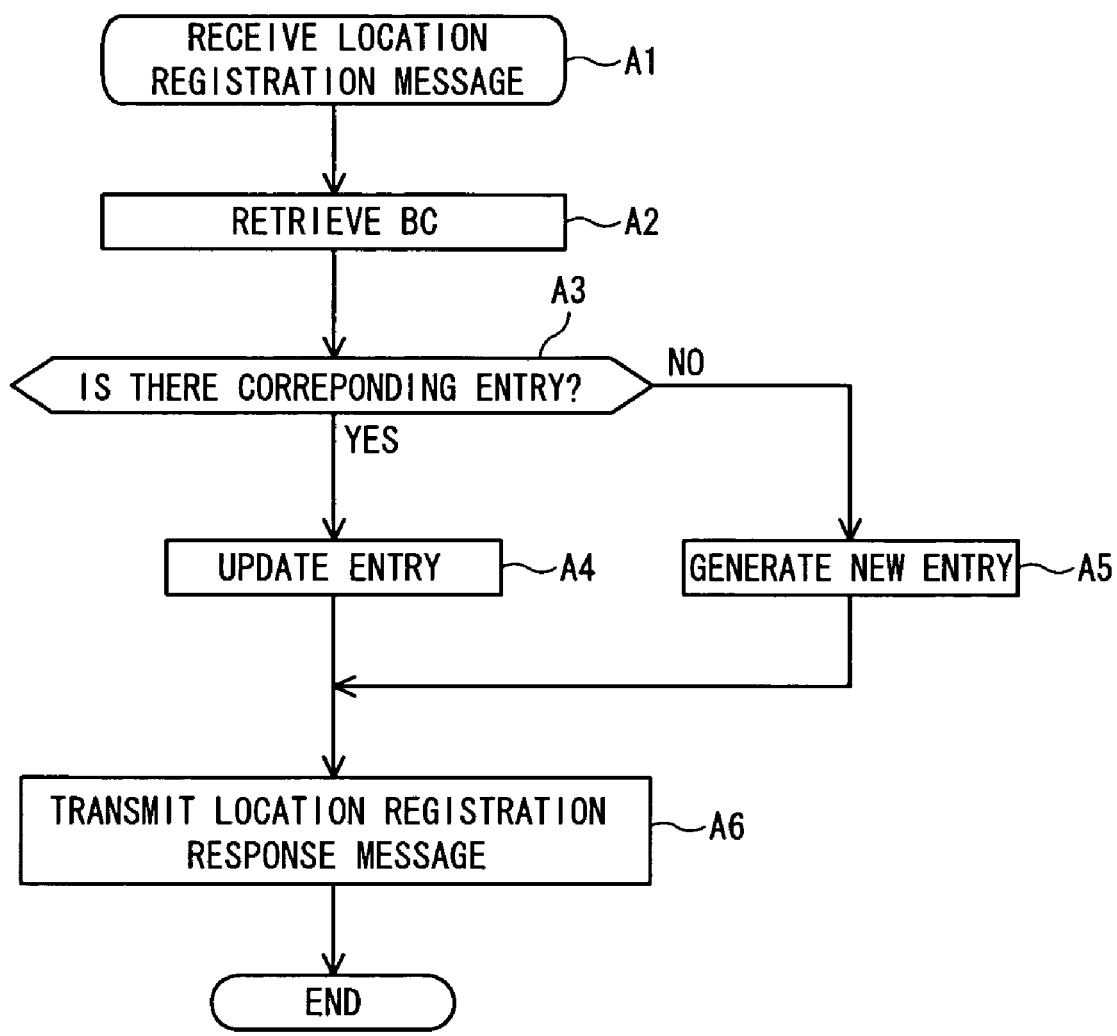
FIG. 11 is a flowchart for describing location registration message processing of an HA according to the first embodiment.
Figure 12:
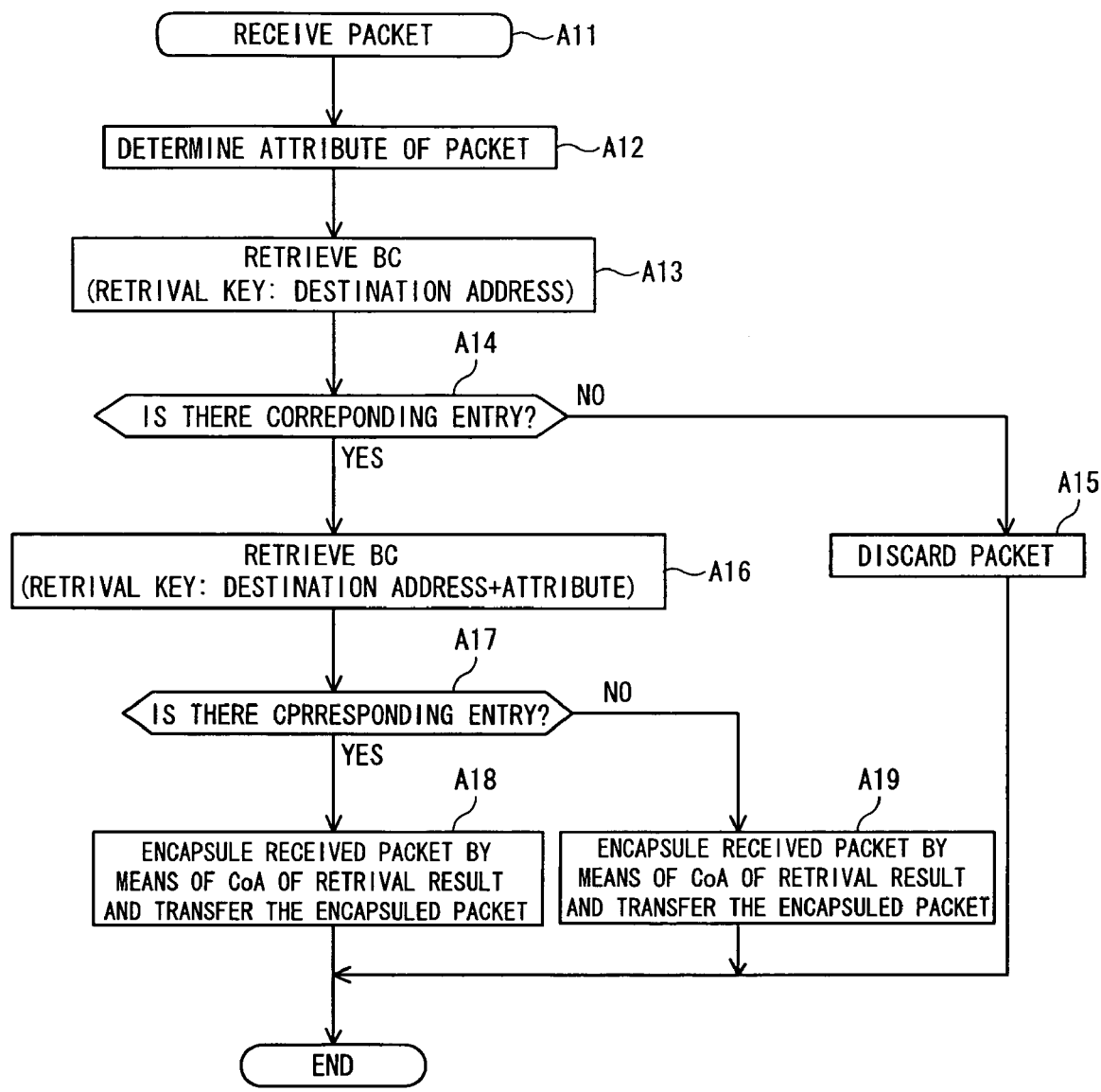
FIG. 12 is a flowchart for describing packet transfer processing of the HA according to the first embodiment.

First, operation of the HA 1 will be described by reference to flowcharts shown in FIGS. 11 and 12. FIG. 11 shows location registration message processing, and FIG. 12 shows packet transfer processing.

(A1-1) Location Registration Message Processing

As shown in FIG. 11, when the HA 1 has received a location registration message from the MN2 by means of the message processing section 13 (step A1), the message processing section 13 retrieves an entry (a set consisting of an HoA, an attribute code, and a CoA) of the location information cache 11 on the basis of specifics of the location registration message (step A2). If no entry is found, the entry is newly registered (a route from NO in step A3 to step A5). If the entry is found, the specifics of the entry are updated (a route from YES in step A3 to step A4).

Subsequently, the HA 1 (the message processing section 13) generates, in response to the location registration message, a location registration response message which is addressed to the MN 2 and which indicates completion of location registration. The HA 1 then transmits the location registration response message by way of the packet transfer section 15 (step A6).

(A1-2) Packet Transfer Processing

In the meantime, as shown in FIG. 12, when the HA 1 has received the packet addressed to the MN 2 (step A11), the packet identification section 12 determines the data attribute (application type) of the received packet from the port number, or the like, of the received packet (step A12). The packet processing section 14 retrieves the location information cache 11 while taking the destination address of the received packet as a retrieval key (step A13).

Consequently, if a corresponding entry is not found, the packet processing section 14 discards the received packet (or transmits the received packet to the home link without encapsulating the packet) (a route from NO in step A14 to step A15). In contrast, when the corresponding entry is found, the location information cache 11 is retrieved while taking the destination address and the data attribute of the received packet as retrieval keys (a route from YES in step A14 to step A16).

If the corresponding entry is found by means of the retrieval operation, the packet processing section 14 encapsulates the received packet with the CoA of the entry, and transmits the thus-encapsulated packet to the packet transfer section 16 (a route from YES in step A17 to step A18). In contrast, when no corresponding entry is found (i.e., the value of the corresponding data attribute is not registered), the packet processing section 14 encapsulates the received packet with a default CoA (e.g., a CoA1 for http) among the plurality of CoAs, and transmits the thus-encapsulated packet to the packet transfer section 15 (a route from step A17 to step A19).

(A2) Description of Operation of the MN

Figure 13:
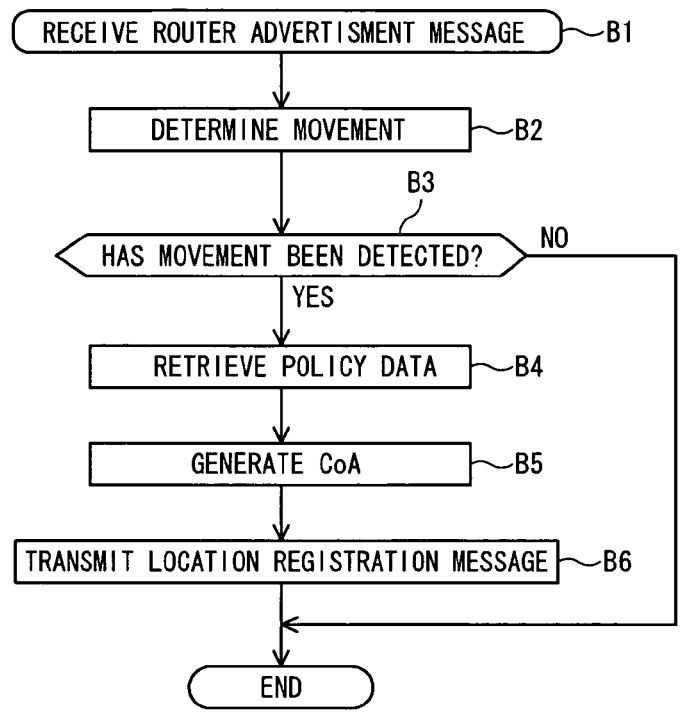
FIG. 13 is a flowchart for describing location registration message transmission processing performed during movement of an MN of the first embodiment.
Figure 14:
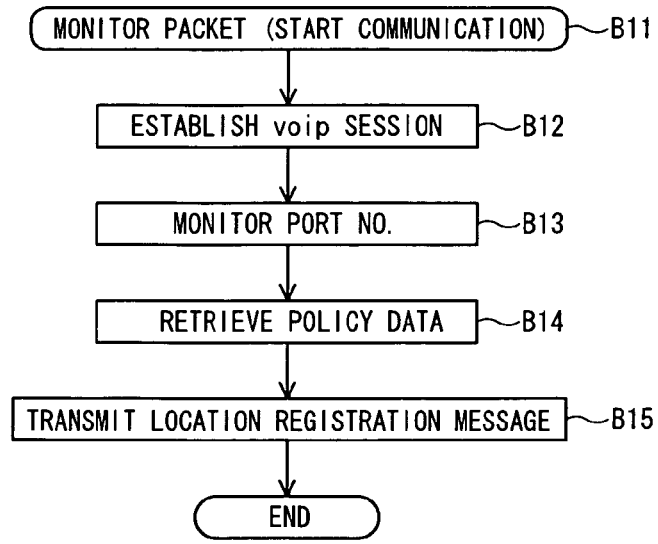
FIG. 14 is a flowchart for describing location registration message transmission processing during voip communication of the MN of the first embodiment.

Next, operation of the MN 2 will be described by reference to flowcharts shown in FIGS. 13 and 14. FIG. 13 is location registration message transmission processing to be performed during movement, and FIG. 14 is a view showing location registration message transmission processing to be performed during voip communication. The processing shown in FIG. 13 is performed for each of the interfaces 21, 22, and 23.

(A2-1) Location Registration Message Transmission Processing to be Performed During Movement As shown in FIG. 13, when the MN 2 has received a router advertisement message from the nearest AR 3 (step B1), the mobility management section 25 ascertains whether or not a prefix portion of a local link included in the router advertisement message is different from a prefix portion of the router advertisement messages that have been received thus far, thereby determining whether or not the MN 2 has moved to a link subordinate to another AR 3 (steps B2, B3).

When movement of the MN 2 has been detected as a result of determination, the movement management section 25 retrieves policy data from the policy data memory 27 (from YES in step B3 to step B4), thereby selecting which one of the interfaces 21, 22, and 23 (types of access lines) is used for communication of the application. The thus-selected interface is reported to the HA1.

In the embodiment shown in FIG. 3, as a result of retrieval of policy data, there is obtained information indicating that the wireless LAN card 21 is used for http communication with the first priority; the PHS card 22 is used with the second priority; and the 3G card is used with the third priority. In connection with voip, there is obtained information indicating that the 3G card 23 is used with the first priority (the other cards are not used) is acquired. Hence, when the MN 2 has moved to an area where a wireless LAN is available, the mobility management section 25 is understood to use the wireless LAN card 21 for http communication but not for voip communication.

Therefore, when performing location registration in the area of the wireless LAN, the mobility management section 25 generates a CoA1 corresponding to the wireless LAN card 21 (step B5), and transmits a correspondence between the CoA1 and the data attribute (http) while including the same in the location registration message addressed to the HA 1 (step B6). When movement of the MN 2 has not been detected, generation/transmission of the location registration message is not performed, and the mobility management section enters a standby condition until the next router advertisement message is received (when NO is selected in step B3).

(A2-2) Location Registration Message Transmission Processing to be Performed During Movement FIG. 14 shows processing for registering in the HA 1 a port number as data attribute information when the port number has been ascertained, because the port number is determined at initiation of voip communication. Namely, although the MN 2 establishes a voip session prior to initiation of communication, a port number used between the terminals (the MN 2 and CN 5) is determined at that time. Hence, the mobility management section 25 monitors the information (steps B11 to B13). As a result, a port number used for communication which is about to be started is determined, and hence the mobility management section 25 retrieves/refers to policy data (step B14), thereby determining/selecting which one of the access lines (the interfaces 21, 22, and 23) is used during voip communication.

Figure 15:
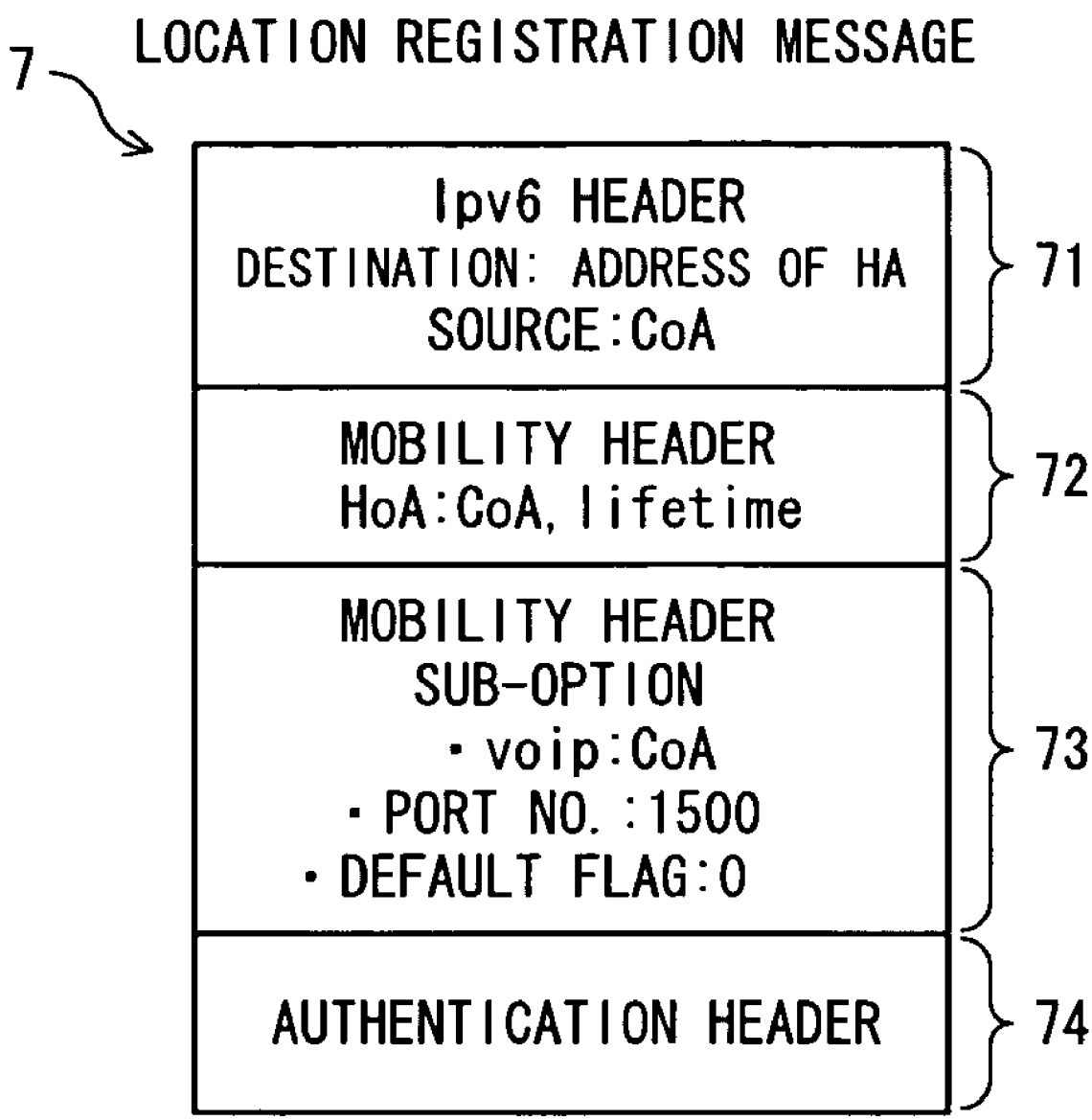
FIG. 15 is a view showing an example of a location registration message used at the initiation of voip communication in the first embodiment.

The mobility management section 25 generates a CoA3 corresponding to the thus-selected interface (the 3G card 23 of the embodiment shown in FIG. 3), and transmits a correspondence between the CoA3 and the data attribute (voip) while including the same in the location registration message addressed to the HA 1 (step B15). FIG. 15 shows an example format of the location registration message employed in this case. The format shown in FIG. 15 is a packet format complying with Mobile-IPv6. Basically, the packet format comprises an IPv6 header 71, a mobility header 72, and an authentication header 74. The mobility management section 25 stores, in the IPv6 header 71, the address of the HA 1 as a destination address and the CoA as the address of a transmission source, and generates and transmits the location registration message 7 to which are added the port number (1500 in the embodiment) used for voip communication and the CoA as a sub-option 73 of the mobility header 72.

A "default flag" in the sub-option 73 is information indicating whether or not the CoA registered by the location registration message 7 is specified as a default transfer destination. When the data attribute cannot be determined by the HA 1, the data attribute is designated for encapsulating the packet and transmitting the encapsulated packet to the default transfer destination. For instance, "1" denotes that the default transfer destination is specified; and "0" denotes that the default transfer destination is not specified.

The above-described embodiment is an example where the MN 2 reports to the HA 1 a port number used for voip communication. The HA 1 can ascertain a port number used for voip communication by monitoring a voip session between the MN 2 and the CN 5, as in the case of the above embodiment.

(A3) Description of Operation of Overall System

Example operation of the overall system will now be described on premise of operation of the previously-described HA 1 and that of the previously-described MN 2, by reference to FIGS. 4 through 10.

Figure 4:
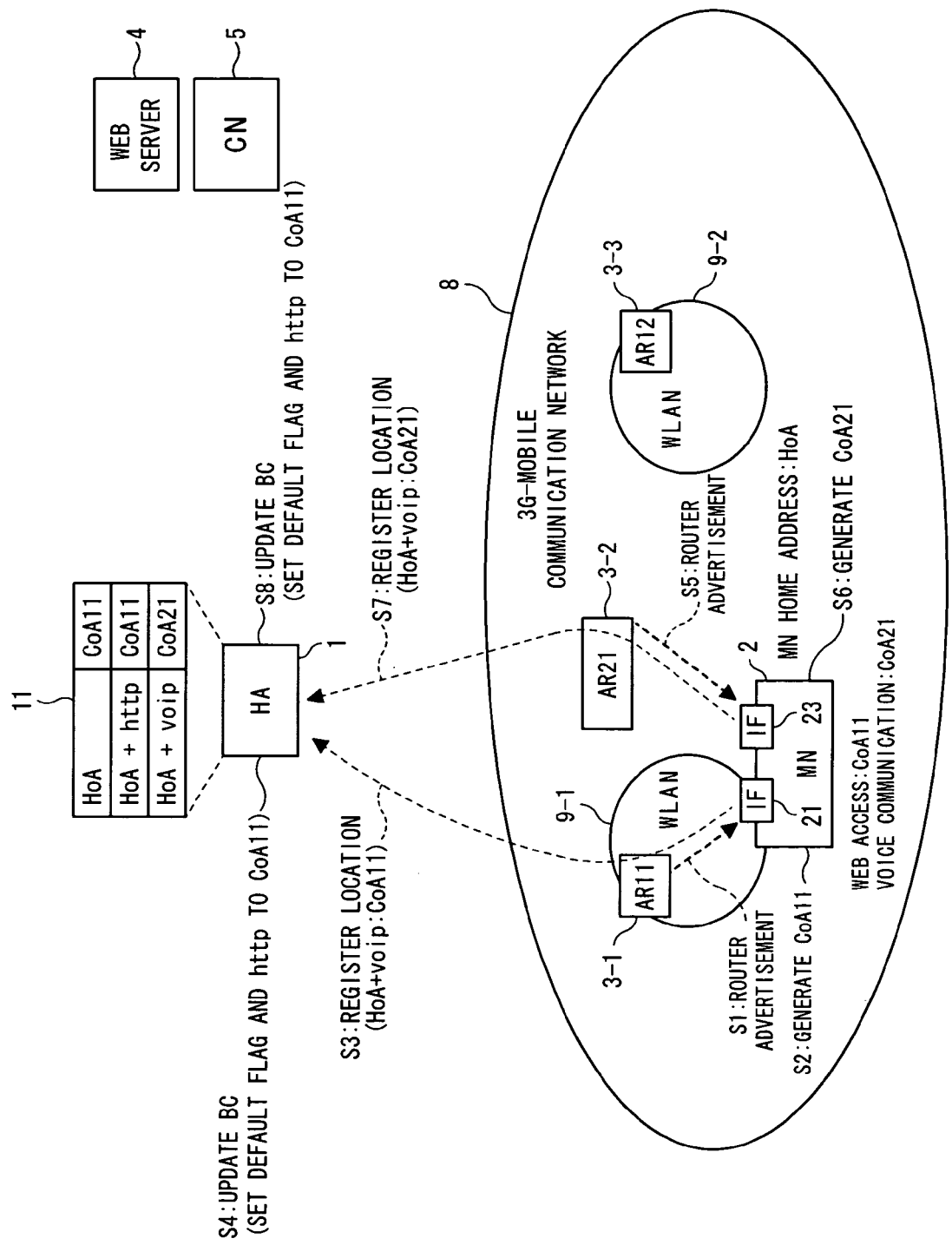
FIG. 4 is a view for describing operation (an application handover) of the mobile communications system of the first embodiment.

First, as shown in FIG. 4, two wireless-LAN areas 9-1, 9-2 exist in the 3G mobile communications network 8. In this case, the MN 2 can access the 3G mobile communications network 8 by way of an AR 3-2 (a router number 21), a wireless LAN 9-1 by way of an AR 3-1 (a router number 11), and a wireless LAN 9-2 by way of an AR3-3 (a router number 12). The MN2 is equipped with the interfaces 21 and 23. The interface 21 is assumed to be a wireless LAN card, and the interface 23 is assumed to be a 3G card. The MN 2 can determine the type of the interface card 21 and that of the interface card 22, and ascertains which one of the interfaces 21, 23 is preferably used for an application.

As mentioned by reference to FIG. 13, the MN 2 receives a router advertisement message periodically transmitted by the AR 3-1 by means of the wireless LAN card 21 (step S1), and ascertains specifics of the message (presence/absence of a change in a prefix portion of the message), thereby determining whether or not the MN 2 has moved to a local link subordinate to the AR 3 different from the access router that has been used thus far. When movement of the MN 2 has been confirmed, the MN 2 refers to or retrieves the policy data by means of the mobility management section 25.

Since the wireless LAN card 21 is now registered as a first priority in the policy data, the mobility management section 25 determines the wireless LAN card 21 as an interface to be used, generates a CoA (CoA11) corresponding to the wireless LAN card 21 (step S2), and generates a location registration message 7 including the CoA11, the HoA, and an application type and transmits the thus-generated location registration message 7 to the HA 1 (step S3).

Figure 5:
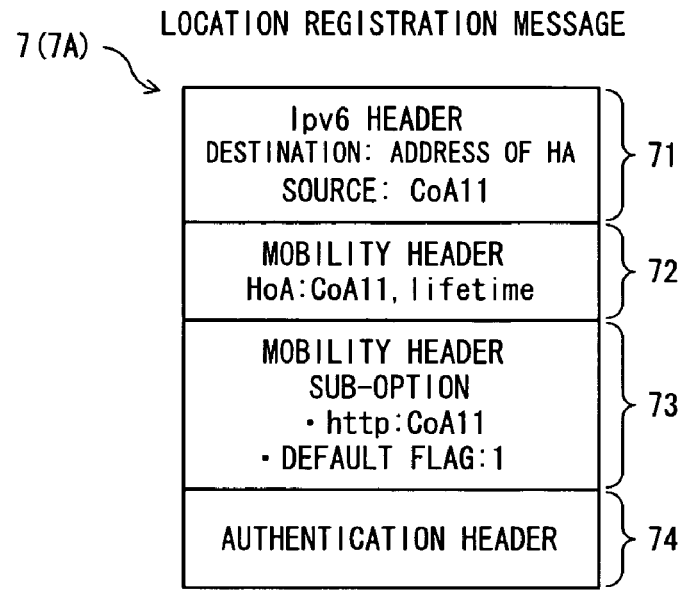
FIGS. 5 and 6 are views showing an example of a location registration message employed in the first embodiment.
Figure 6:
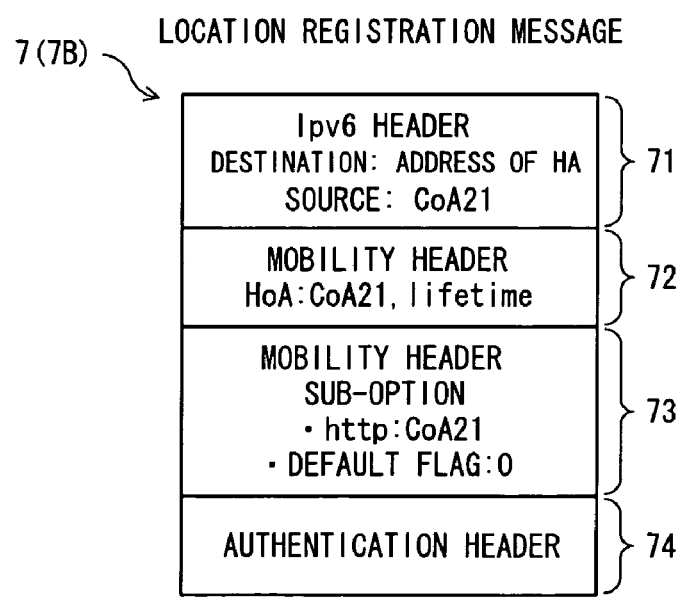

Specifically, as shown in, e.g., FIG. 5, the mobility management section 25 sets the address of the HA 1 as a destination address of the IPv6 header 71 and the CoA11 as the address of a transmission source. The mobility management section 25 causes the mobility header 72 to include the CoA11 and newly generates the sub-option 73 of the mobility header 72; and causes the sub-option 73 to include an application type (http in this embodiment) and the value of CoA desired to be used by the application, thereby generating a location registration message 7 (7A) addressed to the HA 1. In this embodiment, the "default flag" in the sub-option 73 is set to one. As a result, the default transfer destination employed when the HA 1 cannot determine an attribute becomes the CoA11 included in the location registration message 7A.

When the HA 1 has received the location registration message 7A, the message processing section 13 registers/updates the data (entry) into the location information cache 11 of the HA 1 in accordance with specifics of the message (step S4).

When the MN 2 is situated in the area subordinate to the AR 3-2 of the 3G mobile communications network 8, the MN 2 can also receive the router advertisement message from the AR 3-2 by means of the 3G card 23 (step S5). In this case, location registration processing for the 3G card 23 is performed in the same manner independently of (in parallel with) location registration processing for the wireless LAN card 21.

More specifically, the mobility management section 25 generates a CoA21 for the 3G card 23 (step S6). As shown in, e.g., FIG. 6, the address of the HA1 is set as the destination address of the IPv6 header 71, and the CoA21 is set as the address of the transmission source. The CoA21 is included in the mobility header 72, and a sub-option 73 of the mobility header 72 is newly generated. The application type (voip in this embodiment) and the value (CoA21) of a CoA desired to be used for the application are included in the sub-option 73, and a location registration message 7 (7B) addressed to the HA 1 is generated and transmitted (step S7). In this case, however, the default flat in the sub-option 73 is set to 0.

Thus, in the HA 1, the message processing section 13 registers/updates the data (entry) in the location information cache 11 of the HA1 according to specifics of the location registration message 7B (step S8).

Figure 7:
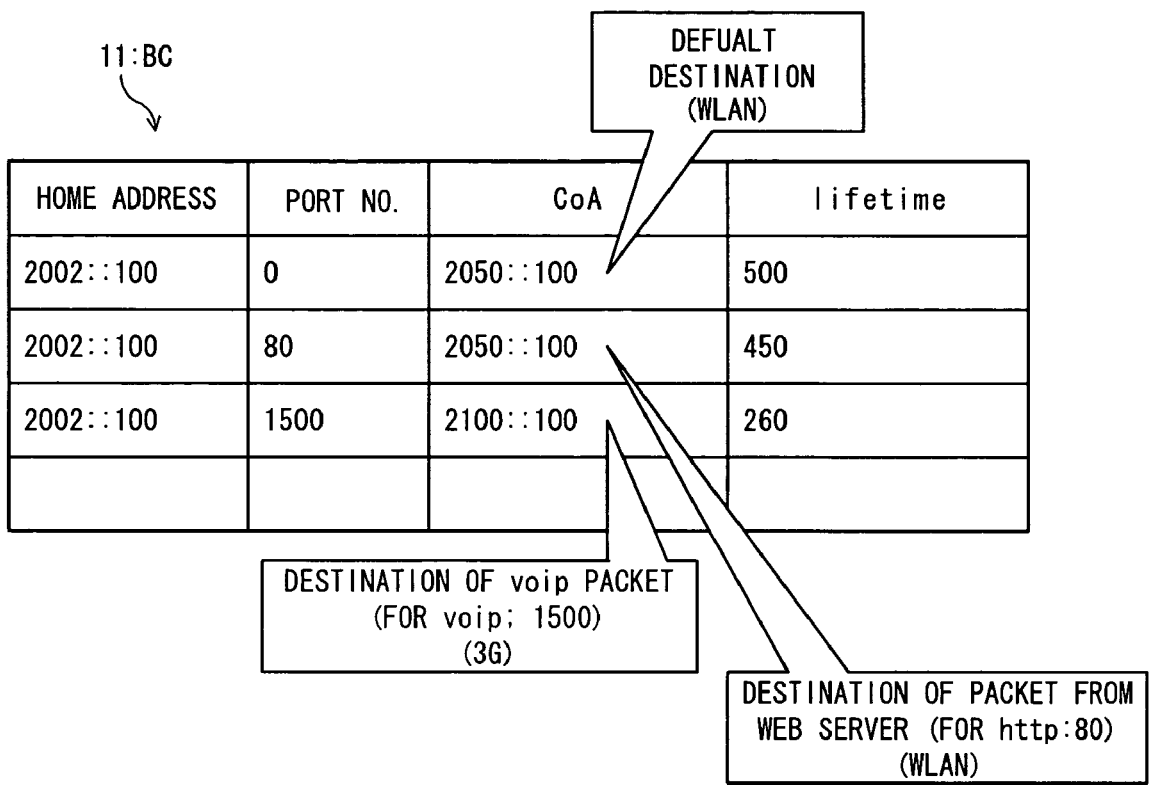
FIG. 7 is a view showing example registration of a location information cache of the first embodiment.

Thus, the HA 1 generates the location information cache 11. FIG. 7 shows example registration of the location information cache 11. As shown in FIG. 7, a set of pieces of information consisting of the home address (HoA) of the MN 2, a port number, the CoA, a lifetime (sec.), etc., is registered in the location information cache 11. The set can be retrieved by taking the home address (HoA=2002::100) and the port number as retrieval keys. Although other items are provided for the Mobile-IPv6, FIG. 7 shows only the elements that are highly relevant to operation of the system of the embodiment.

The "port number" is used for identifying the type of an application. In this embodiment, a port number=90 is registered as an attribute code showing http, and a port number=1500 is registered as an attribute code showing voip. The port number=0 shows an entry of a default transfer destination (a wireless LAN: CoA11=2050::100). Transfer destinations of all of the data whose port numbers do not match the other port numbers are determined in accordance with the entry of this port number=0. For example, the other port numbers are shown in Table 1 provided below.

TABLE 1

| APPLICATIONS AND PORT NUMBERS | |
|---|---|
| APPLICATIONS | PORT Nos. |
| echo | 7 |
| pop3 | 110 |
| Irc | 194 |
| https | 443 |
| rtsp | 554 |

As mentioned previously, during voip communication, the port number is assigned by means of negotiation between a communication partner (CN5) and the network 8 at the time of initiation of communication. Hence, FIG. 7 shows an embodiment where the port number=1500 is assigned through negotiation. The term "lifetime" represents an effective time (sec.) of each entry. When the "lifetime" has expired, the entry is deleted. During communication, the location registration processing is usually performed again before expiration of the "lifetime," thereby preventing dropout of an entry.

CoA11=2050::100 is registered as an access line (a destination to which the packet is transferred from the web server 4) used for http communication (a web access) by way of the port number=80. CoA21=2100::100 is registered as an access line (a transfer destination of a voip packet) used for voip communication (call) by way of the port numbe=1500.

Figure 8:
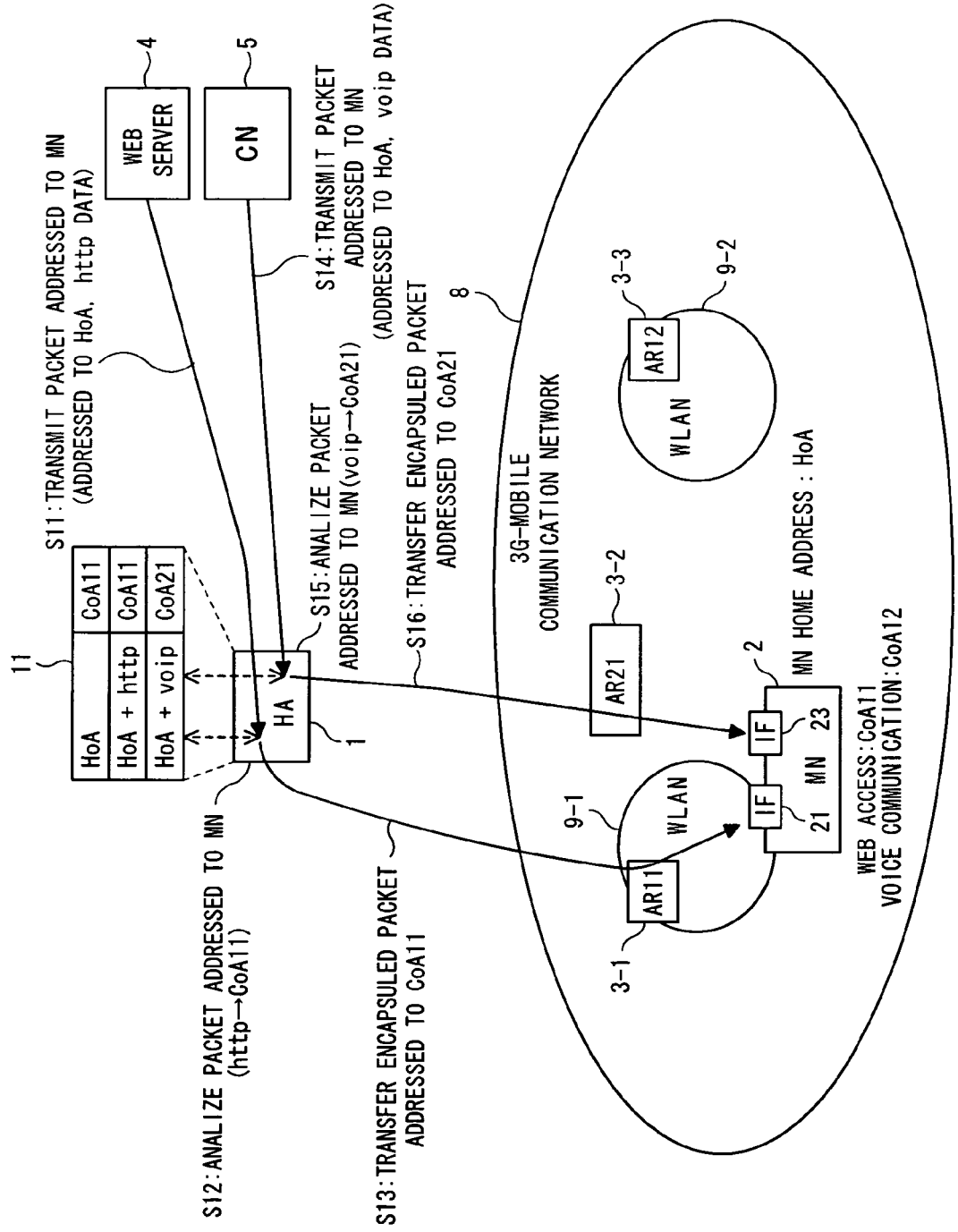
FIGS. 8 to 10 are views for describing operation (an application handover) of the mobile communications system of the first embodiment.

Operation for transferring a packet from the HA 1 to the MN 2 after the location registration processing has been completed as mentioned above will now be described by reference to FIG. 8. As shown in FIG. 8, when the MN 2 has requested data from the web server 4, the web server 4 transmits a packet addressed to the home address (HoA) of the MN 2 in response to the request (step S11). The home address (HoA) is the home link address of the HA 1, and hence the packet is delivered to the home link of the HA 1. The HA 1 intercepts the packet.

At this time, in the HA 1, the packet identification section 12 analyzes the header of the packet, to thus determine that the packet corresponds to http data. More specifically, since the port number=80 showing http data is written in a port number field in the TCP header, the type of an application can be specified by reference to the port number.

The HA 1 retrieves the location information cache 11 by means of the packet processing section 14 while taking the HoA and the specified application type (http) as retrieval keys, thereby acquiring CoA11 as a destination address of the MN 2 (step S12). The original packet received from the web server 4 is encapsulated by the packet processing section 14 and transmitted to the CoA11 as a destination (step S13). Here, the CoA11 is the CoA used for the link subordinate to the AR3-1. Therefore, this packet (http data) is delivered to the MN 2 by way of the link of the wireless LAN 9-1 and received by the wireless LAN card 21 of the MN 2.

Similarly, the voip packet transmitted from the CN 5 simultaneously with the http data is intercepted by the HA 1 (step S14). The HA 1 analyzes the header of the packet by means of the packet identification section 12, thereby identifying that the packet is a voip packet. The packet processing section 14 retrieves the location information cache 11 while taking the HoA and the specified application type (voip) as retrieval keys, thereby acquiring a CoA21 as current information about the MN 2 (step S15).

The packet processing section 14 encapsulates the original packet (the voip packet) received from the CN 5, and transmits the thus-encapsulated packet to the CoA21 as a destination (step S16). The CoA21 is a CoA used for a link of the AR 3-2, and hence the voip packet is delivered to the MN 2 by way of the 3G mobile communications network 8, and is received by the 3G card 23 of the MN 2.

As mentioned above, in the embodiment, the packet can be received by way of an access network desired by the MN 2 in accordance with an application.

Figure 9:
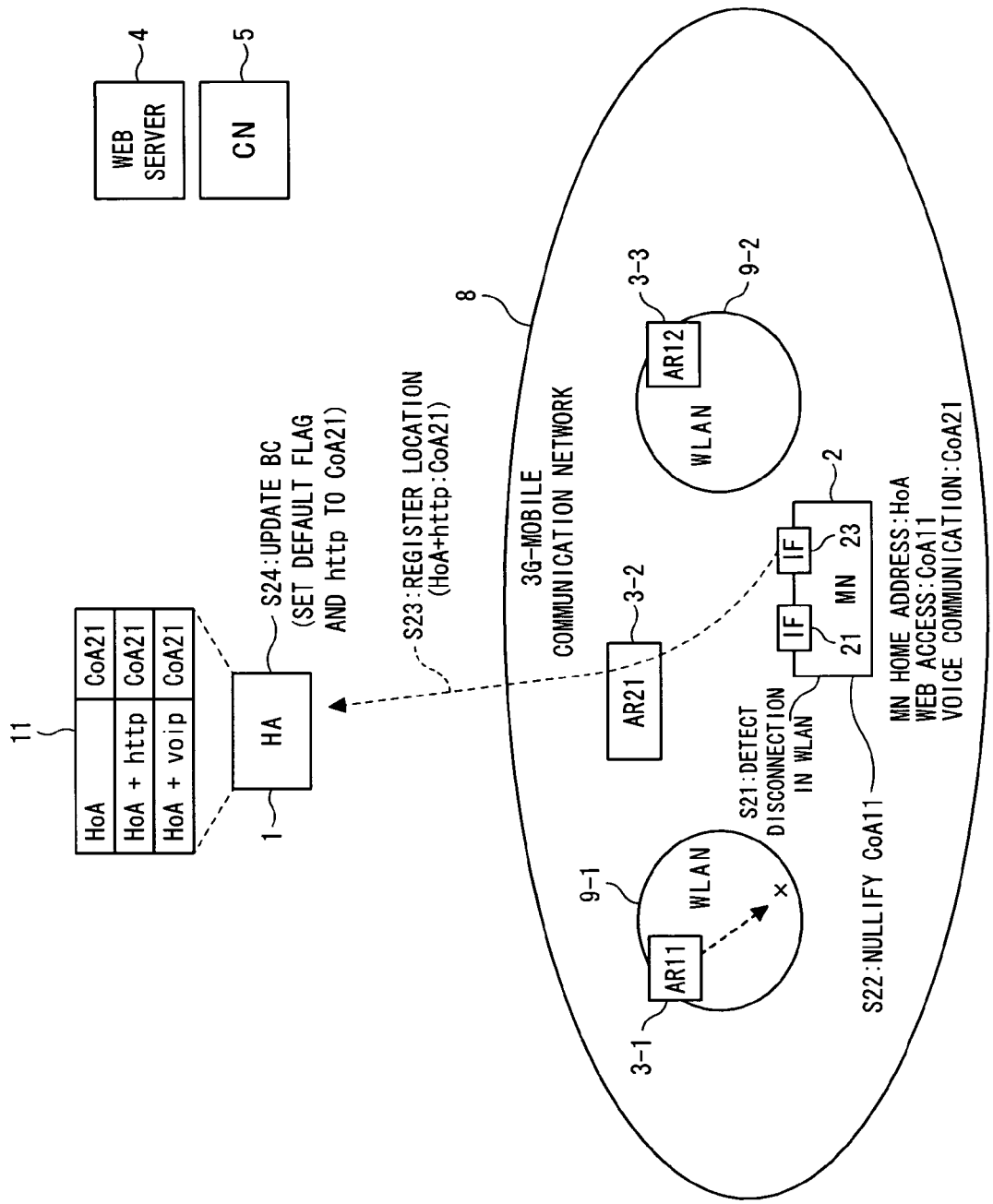

Next, the MN 2 is assumed to have moved from the location shown in FIG. 8 in a rightward direction of the paper as shown by FIG. 9 and moved out of the area of the wireless LAN 9-1. In this case, when the mobility management section 25 detects from, e.g., information about the intensity of a received radio wave, that the link of the wireless LAN 9-1 is already unavailable for the MN 2, by way of the wireless LAN card 21 (step S21), the CoA11 assigned to the wireless LAN card 21 cannot be used. Therefore, there is performed processing for changing (handing over) the route for receiving the http data from the web server 4 from the wireless LAN 9-1 to the 3G mobile communications network.

Specifically, the MN 2 (the mobility management section 25) nulls the CoA11; determines the 3G having the priority level next to the wireless LAN as an access line; and changes the transfer destination of the http data to the effective CoA21 used by the 3G mobile communications network 8 by means of the location registration message 7 addressed to the HA1 (the default transfer destination is also changed to the CoA21 at this time; steps S23, S24). Thus, the MN 2 sequentially selects an optimum access network from among the access networks that are available at that point in time, and uses the selected access network.

Figure 10:
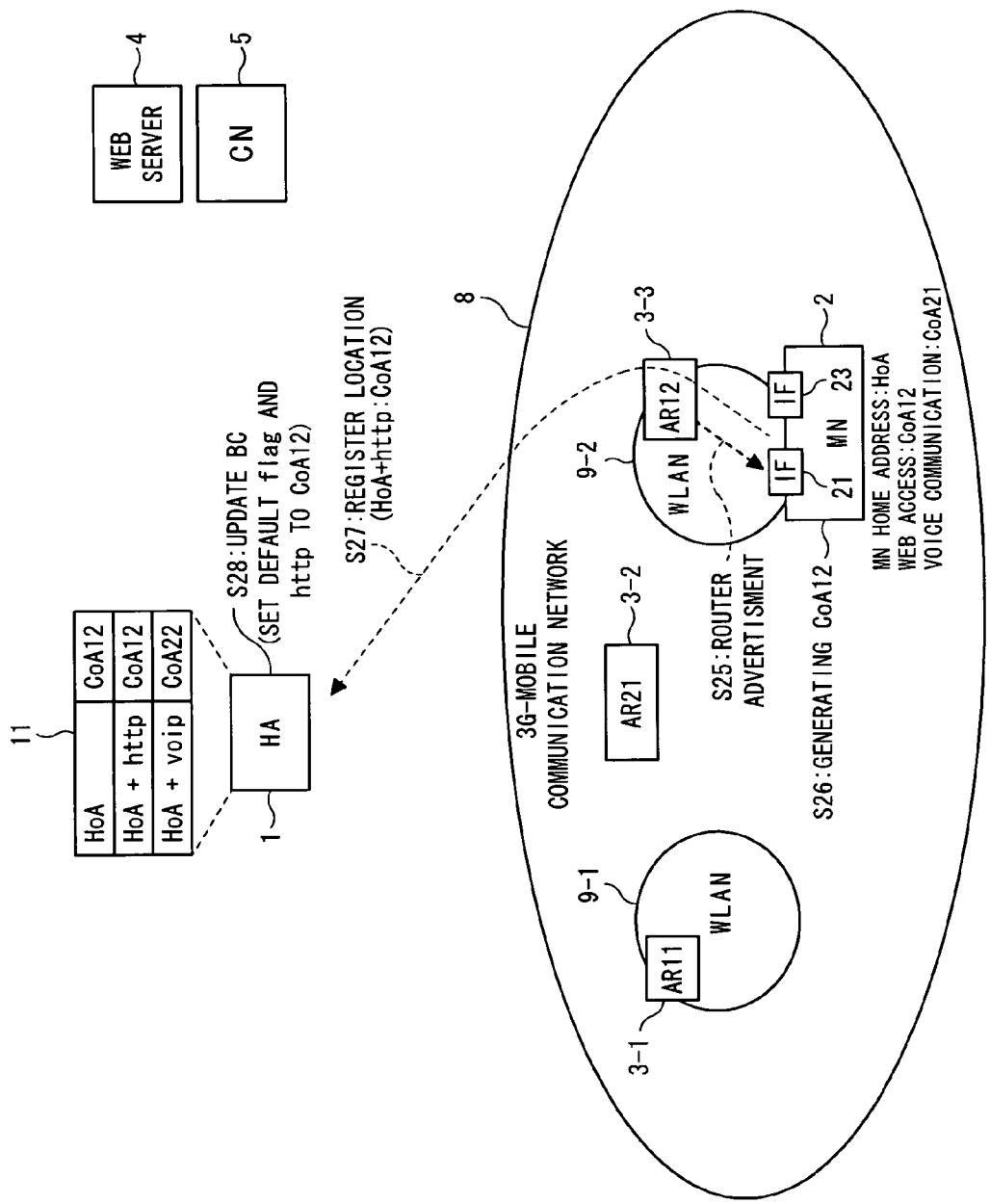

As shown in FIG. 10, the MN 2 is assumed to have entered the area of another wireless LAN 9-2 as a result of having further moved in the rightward direction of the paper. The MN 2 (the mobility management section 25) receives the router advertisement message periodically transmitted from the AR 3-3 (step S25); detects movement of the MN 2 in the manner mentioned previously; newly generates a CoA12 for the wireless LAN card 21 (step S26); and registers the CoA12 into the location information cache 11 of the HA 1 by means of the location registration message 7 (steps S27, S28).

In the above-described embodiment, the policy data are given to the MN 2, as well. However, all or some of the policy data may be registered in the HA 1 or another server or the like in advance. In this case, the essential requirement is that the MN 2 reports the CoA that changes in association with movement to the HA 1 and that the HA 1 accesses the policy data in itself or in another server, to thus determine a correlation between the application type and the CoA to be used.

(A4) Description of a First Modification

In the above-described embodiment, the CN 5 always transmits, to the link (HA 1) of the home address of the MN 2, the packet addressed to the MN 2. However, if the route optimization function of the Mobile-IPv6 is applied, the packet can be transmitted directly to the MN 2 while bypassing the HA 1. At this time, if the CoA desired by the MN 2 for receiving a packet is reported from the MN 2 to the CN 5, an access line to be used for receiving a packet can be specified (changed) after receipt of the packet; that is, after initiation of communication.

Figure 16:
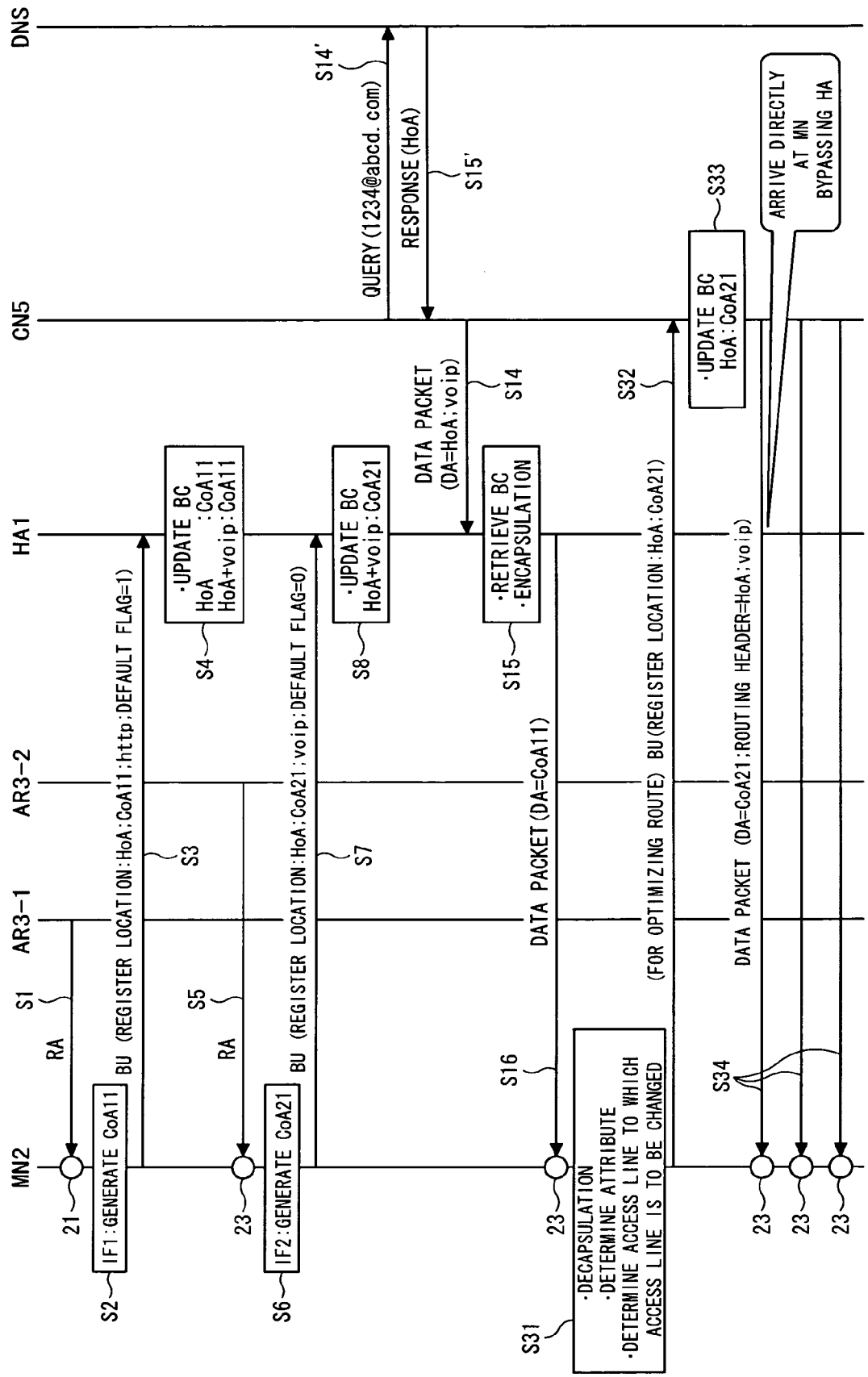
FIG. 16 is a sequence diagram for describing operation (route optimization) of the mobile communications system employed as a first modification of the first embodiment.

Such an operation will be described hereinbelow by reference to a sequence diagram shown in FIG. 16. In FIG. 16, unless otherwise specified, operations pertaining to steps S1 to S8, S14, S15, and S16 are the same as or analogous to those described by reference to FIGS. 4 and 8.

At the start of communication with the MN 2, the CN 5 sends an inquiry about the home address (HoA) of the MN 2 to a DNS (Domain Name System) or the like (query transmission), to thus acquire the home address of the MN 2 (steps S14', S15'), and transmits the packet to the thus-acquired home address (step S14). As mentioned previously, the packet is encapsulated by the HA 1 (step S15) and transmitted to the MN 2 (step S16).

When the MN 2 has received the packet (voip packet) of the CN 5 encapsulated and transmitted by the HA 1 (step S16), the packet identification section 24 identifies the data attribute (voip) of the received packet while taking receipt of the packet as a trigger (the address of the CN 5 is also ascertained at this time by reference to the address of the transmission source of the received packet). The route optimization section 253 reports, to the CN 5, an access line by way of which the packet of that data attribute is desired to be received in subsequent operations, by means of the location registration message for optimizing a route.

For instance, when the MN 2 desires to receive a packet from the CN 5 by way of the access line of the 3G mobile communications network 8 by means of the 3G card 23, the MN 2 transmits the CoA21 to the CN 5 while the CoA21 is included in the location registration message for optimizing a route (steps S31, S32).

Upon receipt of the above-described location registration message, the CN 5 registers/updates the CoA (CoA21) included in the message in the location information cache (omitted from the drawings) which is managed by itself like the location information cache in the HA 1 (step S33). Subsequent data packets addressed to the MN 2 are transmitted to the CoA21 rather than to the home address (step S34).

The MN 2 determines the data attribute of the packet while taking receipt (arrival) of the packet from the CN 5 as a trigger, and address information (CoA) about a desired access line corresponding to the data attribute is reported to the CN 5. As a result, the CN 5 that has received the report can change the destination of subsequent transmission packets to the access line reported by the MN 2.

(A5) Description of a Second Modification

Figure 17:
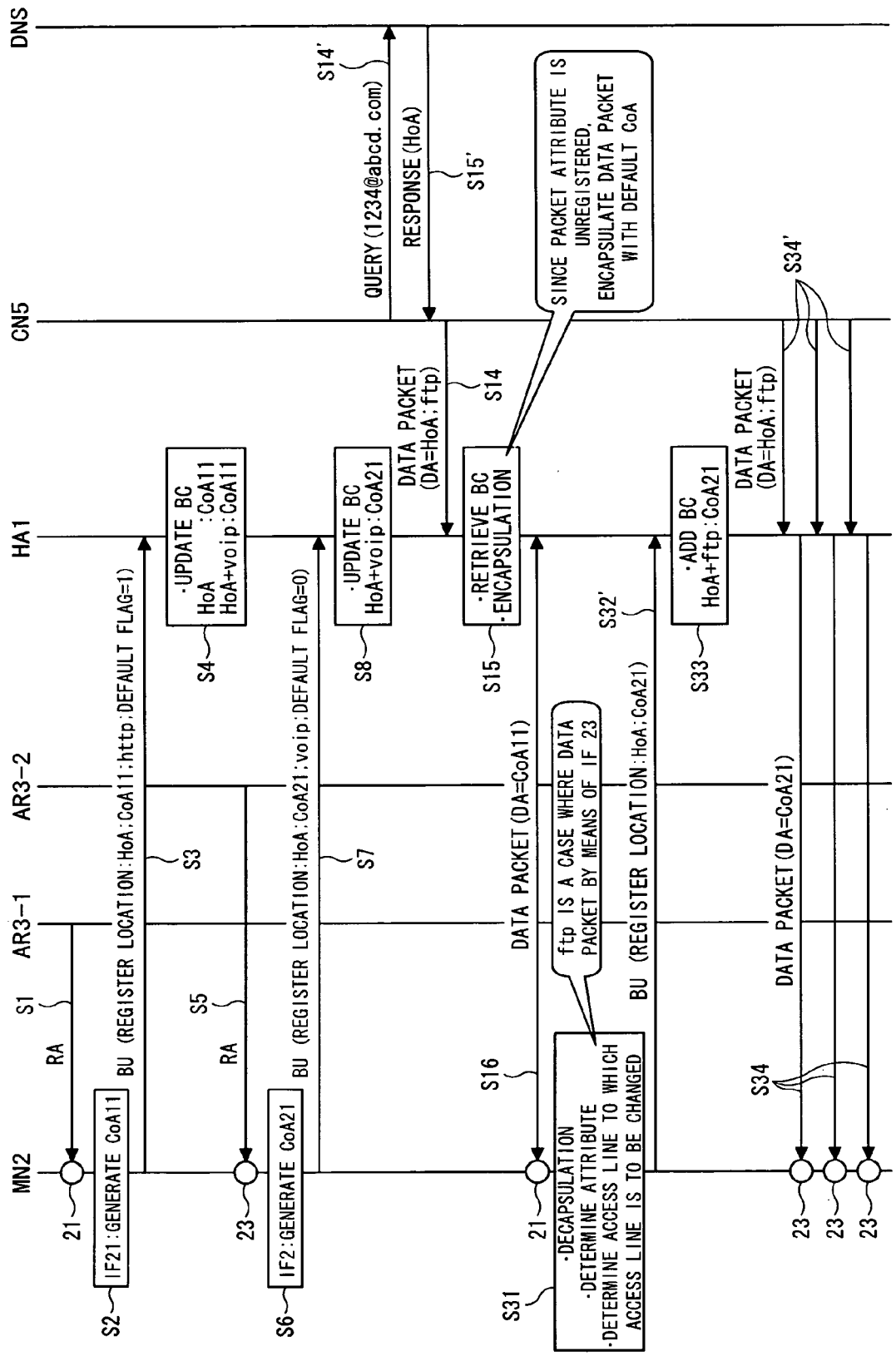
FIG. 17 is a sequence diagram for describing operation (specification of an access line after initiation of communication) of the mobile communications system employed as a second modification of the first embodiment.

Another example operation for specifying an access line used by the MN 2 for receiving a packet after initiation of communication between the MN 2 and the CN 5 will be described by reference to a sequence diagram shown in FIG. 17. In FIG. 17, unless otherwise specified, operations pertaining to steps S1 to S8, S14 to S16, S14', and S15' are the same as or analogous to those described by reference to FIGS. 4, 8, and 16.

First, in this case, the CN 5 is assumed to have transmitted the data packet to the MN 2 by means of ftp (step S14). In this case, since the CoA concerning the data attribute (ftp) has not yet been registered in the location information cache 11, the HA1 encapsulates the received packet with the CoA (CoA11) of the default transfer destination, and transfers the thus-encapsulated packet to the MN 2 (step S16). As a result, the MN 2 receives the ftp packet from the CN 5 by way of the wireless LAN by means of the wireless LAN card 21.

In the MN 2, the packet identification section 24 identifies the data attribute (ftp) of the received packet while taking receipt of the packet as a trigger (the address of the CN 5 is also determined at this time by reference to the address of the transmission source of the received packet). The route changing section 254 reports, to the HA 1, an access line by way of which the packet of the data attribute is desired to be received, by means of a location registration message for optimizing a route.

For example, when the packet is desired to be received from the CN 5 by way of the access line of the 3G mobile communications network 8 by means of the 3G card 23, the MN 2 transmits the CoA21 while the CoA21 is included in the location registration message addressed to the HA 1 (steps S31, S32').

Upon receipt of the location registration message, the HA 1 registers (adds) a set consisting of the data attribute (ftp) and the CoA (CoA21), both being included in the message, into the location information cache 11 (step S33). Subsequent data packets addressed to the MN 2 which are received from the CN 5 (step S34') are encapsulated with the CoA21, and the thus-encapsulated packets are transferred to the MN 2 (step S34).

As mentioned above, in the present modification, the MN2 determines the data attribute of the packet while taking receipt of the packet from the CN 5 as a trigger, and reports to the HA 1 the address information (CoA) about a desired access line corresponding to the data attribute, so that the HA 1 having received the report can change a destination to which subsequent data are to be transferred, in accordance with specifics of the report.

(A6) Description of a Third Modification

Figure 18:
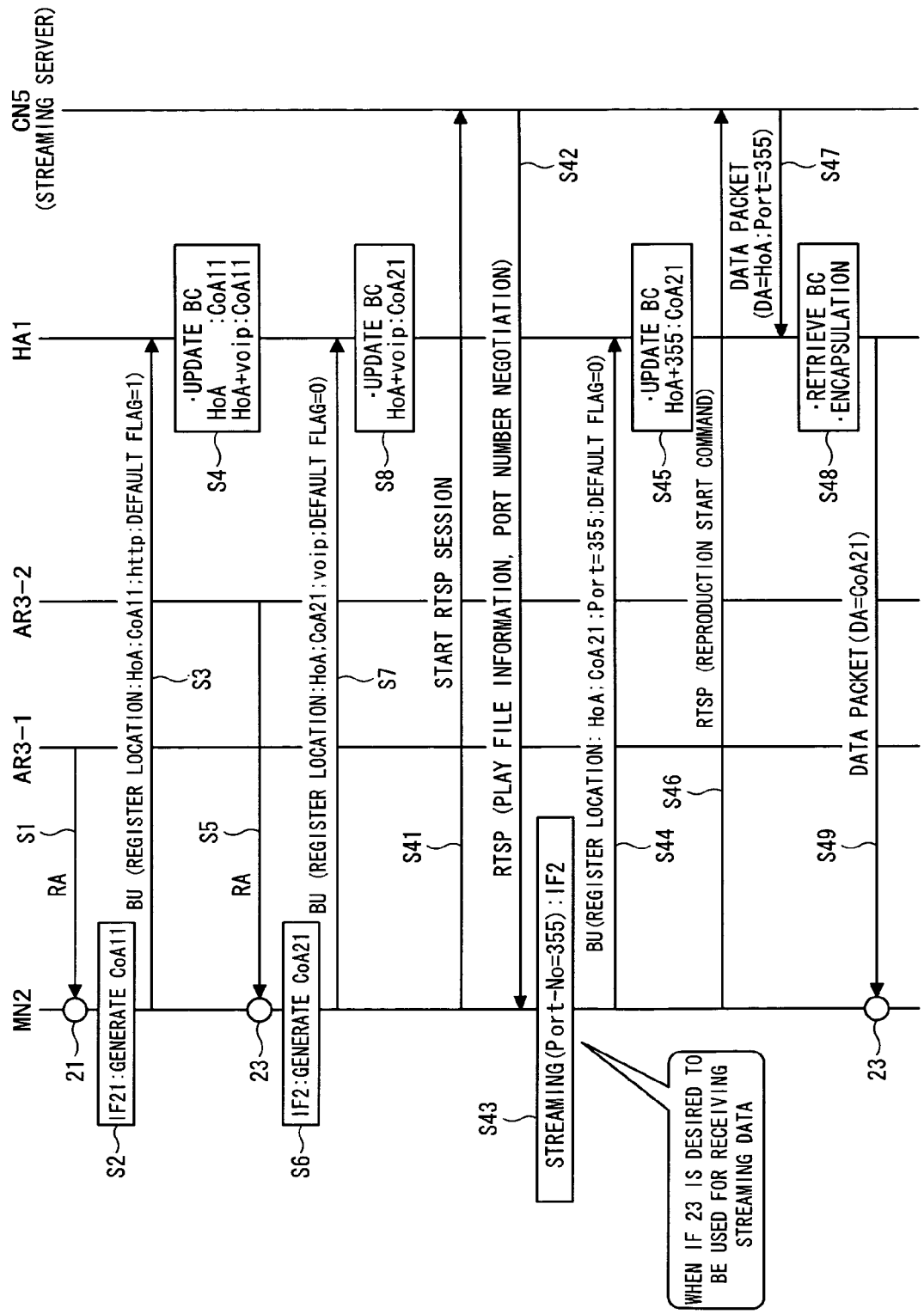
FIG. 18 is a sequence diagram for describing operation (streaming service) of a mobile communications system according to a second embodiment.

Next will be described an example operation performed when the MN 2 accesses a streaming server acting as the CN 5 to receive a streaming service [plays contents (a motion picture) while downloading data], by reference to a sequence diagram shown in FIG. 18. In FIG. 18, unless otherwise specified, operations pertaining to steps S1 to S8 are also the same as or analogous to those described by reference to FIGS. 4 and 8.

In this case, the MN 2 initially starts session with the streaming server 5 and the RTSP (Real Time Streaming Protocol) by means of the port number negotiation section 255 (step S41), thereby performing negotiation for required information (play file information, a port number, or the like) by means of RTSP (step S42), to thus acquire a port number=355.

When desiring to receive a streaming service through use of, e.g., the 3G card 23 (step S43), the MN 2 transmits, to the HA 1, the HoA, the CoA21 corresponding to the 3G card 23, the port number (data attribute)=355 obtained through negotiation, and the location registration message including the default flat=0, by means of the function of the location registration message issuance section 252 (step S44).

Upon receipt of the location registration message, the HA 1 registers the set of the HoA and the CoA21, both of which are included in the message, and the port nubmer=355 in the location information cache 11, to thus update the location information cache 11 (step S45). Subsequently, the MN 2 transmits a play start command to the streaming server 5 by means of RTSP (step S46). The streaming server 5 having received the play start command transmits data packets to the home address of the MN 2 by means of the port number=355 (step S47).

The data packets are then received by the HA 1, and the HA 1 retrieves the location information cache 11 while taking the HoA of the received packets and the port number=355 as keys, to thus acquire the corresponding CoA21. The thus-received packets are encapsulated by the CoA21, and the thus-encapsulated packets are transferred. As a result, the packets are received by the 3G card 23 of the MN 2 by way of the access line of the 3G mobile communications network 8 (steps S48, S49).

As mentioned above, in the present modification, when the identification information (the port number used for receiving a streaming packet in this modification) about the data attribute used between the MN 2 and the CN 5 is adjusted before communication, the MN 2 reports, to the HA 1, a correspondence between the data attribute and the address information about a desired access line after adjustment of the data attribute identifier, thereby enabling communication with the CN 5 through use of the desired access line corresponding to the data attribute.

[B] Description of a Second Embodiment

Figure 19:
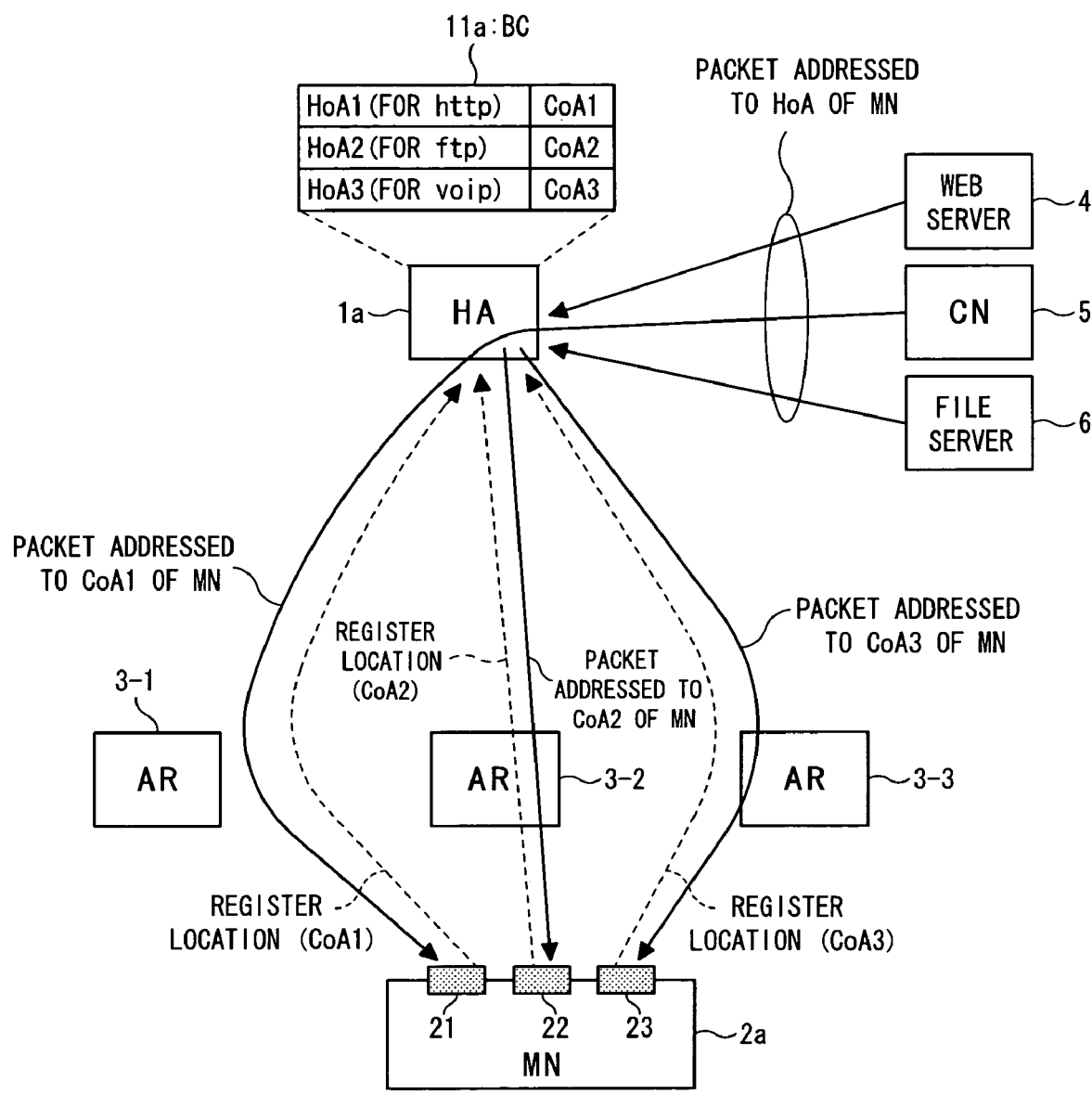
FIG. 19 is a block diagram showing the configuration of a mobile communications system according to a second embodiment of the present invention.

FIG. 19 is a block diagram showing the configuration of a mobile communications system according to a second embodiment of the present invention. The mobile communications system shown in FIG. 19 also comprises a home agent node (HA) a1 having a home agent function of Mobile-IPv6; a mobile node (MN) 2*a* having a client function of Mobile-IPv6; the routers (ARs) 3-1, 3-2, and 3-3 which can be accessed by the MN2*a* by means of wireless communication and provided in the Internet; the web server 4 which offers web service (contents delivery service) to the MN 2*a*; the counterpart communication node (CN) 5 with which the MN 2*a* establishes communication through use of a predetermined protocol such as voip or ftp; and the file server 6 for offering file transfer service to the MN 2*a* by means of ftp or the like.

Even in this embodiment, the HA 1*a* has the function of managing the destination address (CoA) of the MN 2*a* by means of a location information cache (Binding Cache) 11*a*; encapsulating packets through use of the latest CoA of the MN 2*a* managed by the location information cache 11*a* upon receipt of packets addressed to the MN 2*a*, which are sent from the web server 4, the CN 5, or the file server 6 to the HA 1; and transferring the encapsulated packets to the MN 2*a*.

In contrast with the first embodiment, in the present embodiment the HA 1*a* (the location information cache 11*a*) manages the CoA (CoA1, CoA2, and CoA3) for respective types (data attributes) of service applications, such as http, ftp, voip, or the like, which can be utilized by a single MN 2*a*, as well as managing the HoA (HoA1, HoA2, and HoA3). In short, in the present embodiment, a plurality of HoAs can be registered for a single MN 2*a* according to an application, and the HoAs are handled as identification information (attribute codes) about the data attributes. As a result, the HA 1*a* can substantially determine the CoA for each service application utilized by the MN 2*a*. However, the respective HoAs are set as a result of the MN 2*a* registering HoAs desired to be used in accordance with an application.

When the packet addressed to the MN 2*a* has arrived at the HA 1*a*, the HA 1*a* retrieves the location information cache 11*a* on the basis of the destination address of the packet, to thus encapsulate the packet with the HoA and transfer the thus-encapsulated packet. The function of such an HA 1*a* is the same as or analogous to that of an existing HA. A principal difference between the function of the HA 1*a* and that of the existing Ha lies in that the location information cache 11*a* manages a plurality of HoAs for a single MN 2*a*. As a result, as in the case of the embodiment, the MN 2*a* can establish communication with the web server 4, the CN 5, or the file server 6 by designating an access line desired to be used from one application to another.

The present embodiment is a method for establishing communication by assigning a plurality of HoAs to one MN 2*a* and changing the HoA in accordance with an application. Much communication is started by the client so as to request data from a server. Therefore, the server specifies a counterpart terminal by means of observing a packet of the requested data. Specifically, a different HoA is set for one application to another, and the thus-set HoA is transmitted to the address of the sender of the packet which is transmitted by the MN 2*a*. As a result, the server automatically specifies one from the plurality of MoAs assigned to the MN 2*a*, and can transmit the packet addressed to the MN 2*a*.

Figure 20:
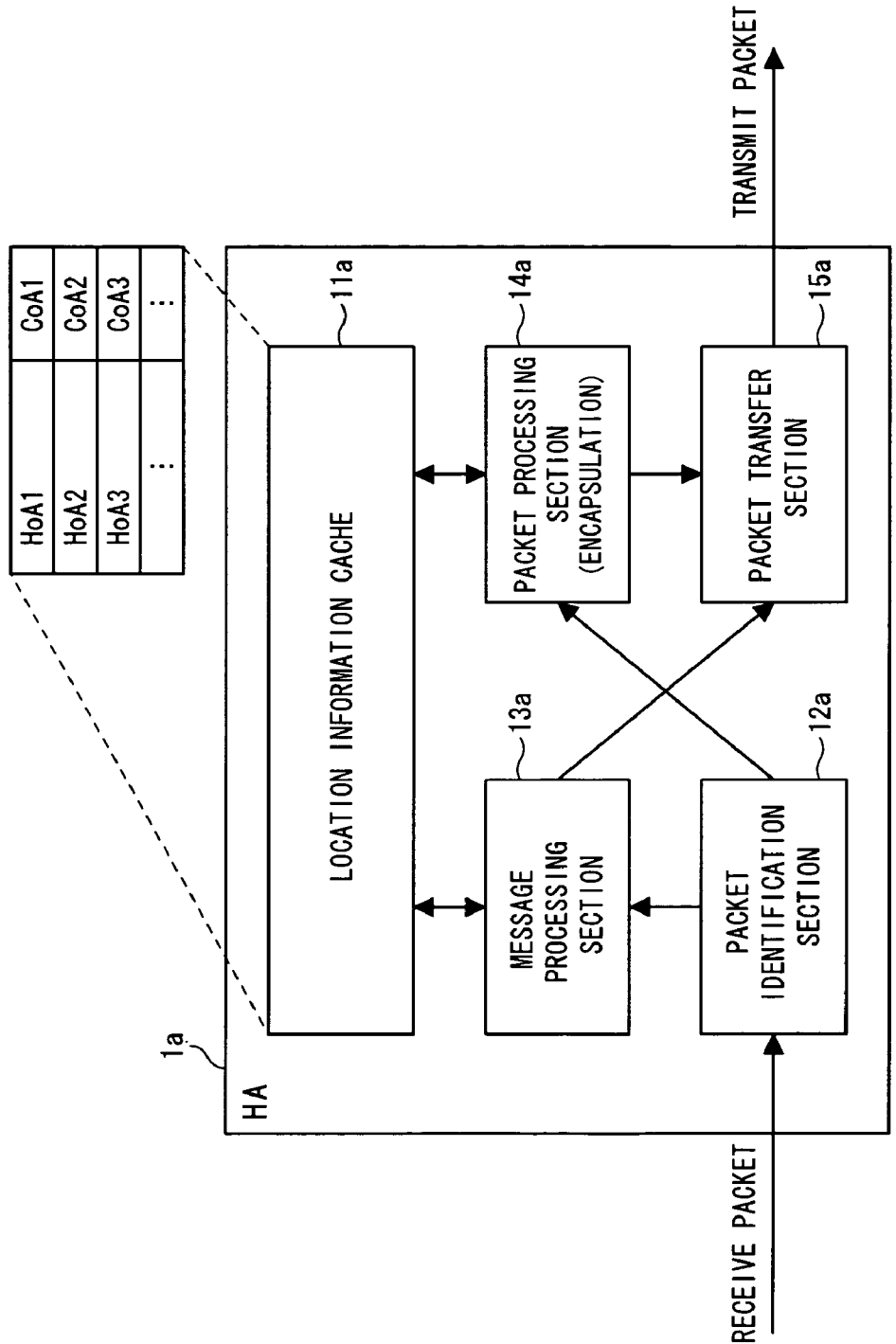
FIG. 20 is a functional block diagram showing the configuration of a home agent node (HA) shown in FIG. 19.

Therefore, the essential requirement for the HA 1*a* of the present embodiment is to have the same functions as those of the existing HA or the functions analogous to those of the existing HA, in addition to having the above-described location information cache 11*a*. As shown in, e.g., FIG. 20, the HA 1*a* comprises a packet identification section 12*a*, a message processing section 13*a*, a packet processing section 14*a*, and a packet transfer section 15*a*.

The packet identification section 12*a* has the function of: analyzing the header of the received packet to thus identify whether or not the received packet is addressed to its own node (the HA1*a*), whether or not the received packet is a control message, such as a location registration message (Binding Update) when the packet is addressed to its own node, and whether or not the packet is a packet addressed to the MN 2*a*.

When the received packet is identified by the packet identification section 12*a* as not being addressed to its own node (the HA 1*a*), the received packet is transferred in unmodified form to another target node by way of the packet processing section 14*a* and the packet transfer section 15*a*. When the received packet is identified as a location registration message addressed to its own node, the received packet is passed to the message processing section 13*a*. In contrast, when the received packet is identified as a packet addressed to the MN 2*a*, the packet is passed to the packet processing section 14*a*.

The message processing section 13*a* processes the control message output from the packet identification section 12*a*. If the control message is the location registration message, the message processing section 13*a* has the function of updating/ registering the current location information (CoA) about the MN 2*a* included in the message into the location information cache 11*a*, or deleting an unnecessary CoA.

The packet processing section 14*a* has the function of: retrieving the CoA corresponding to the HoA included in the packet by reference to the location information cache 11*a* upon receipt of the packet addressed to the MN 2*a* from the packet identification section 12*a*; and encapsulating the packet with the CoA. The encapsulated packet is passed to the packet transfer section 15*a*.

The packet transfer section 15*a* has the function of transferring (routing) the packet received from the message processing section 13*a* and the packet processing section 14*a* on the basis of a routing table (omitted from the drawings).

As shown in, e.g., FIG. 21, the MN 2*a* of the present embodiment is configured by comprising a mobility management section 25*a*, a packet processing section 26*a*, and policy data memory 27*a*, in addition to including the previously-described the interfaces 21, 22, and 23 having the same functions as those described in connection with the first embodiment; the packet identification section 24, and the application section 28. Even in this embodiment, for instance, the interface 21 is also assumed to be for a wireless LAN (a wireless LAN card); the interface 22 is also assumed to be for a PHS (a PHS card); and the interface 23 is also assumed to be for 3G (3G card).

The mobility management section 25*a* has the function of detecting movement of the MN 2*a* and generating a required location registration message to be transmitted to the HA 1*a*. In the present embodiment, the mobility management section 25*a* also has the following functional sections:

(1) An application-specific CoA generation section (an application-specific mobile node identifier assignment section) 256 for assigning HoA (HoA1, HoA2, and HoA3) (mobile node identifiers) in accordance with the type of application usable for the MN 2*a*, and generating a CoA (CoA1, CoA2, and CoA3) of an access line (the interfaces 21, 22, and 23) used for receiving the packet of that application type.

(2) A CoA selection section 257 for determining (selecting) a CoA which is used for each HoA, from the CoA assigned to the currently-available interface 21, 22, or 23 and specifics of the policy data in the policy data memory 27.

(3) A location registration message issuance section (a second transfer destination address information notification section) 258 which transmits (reports) to the HA 1*a* the selected HoA and the CoA while the HoA and the CoA are included in the location registration message addressed to the HA 1*a*.

The home address (HoA) is assigned to the HA 1*a* and the MN 2*a* without involving an overlap therebetween. At that time, there may be a case where a network manager, or the like, has assigned a fixed value to the MN 2*a* in advance or a case where the MN 2*a* automatically generates a home address by combination of a prefix of the home network and an interface ID. In any event, the MN 2*a* selects any one from the available assigned HoAs (the same applies to the previously-described first embodiment).

In this case, an association of the application type with the HoA may also be fixed. In addition to having the above-described elements, the mobility management section 25*a* also has the route optimization section 253, the route changing section 254, the port number negotiation section 255, which are the same as those described in connection with the first embodiment, and a home address (HoA) selection section 259.

The home address selection section (a mobile node identifier selection section) 259 selects, on the basis of the policy data, a HoA corresponding to a port number (an application type) obtained before communication through negotiation with the CN 5 performed by the port number negotiation section 255. In this case, a set consisting of the selected HoA and the CoA of the available access line is reported/registered in the HA1a by means of the location registration message issuance section 258.

The policy data memory 27a stores policy data used for determining an access line to be used (the HoA and the interfaces 21, 22, and 23) for each type of application. When the packet processing section 26a generates a transmission packet, an HoA to be used is determined for each application type by reference to the policy data. The thus-determined HoA is set as the address of a transmission source of a transmission packet.

Figure 21:
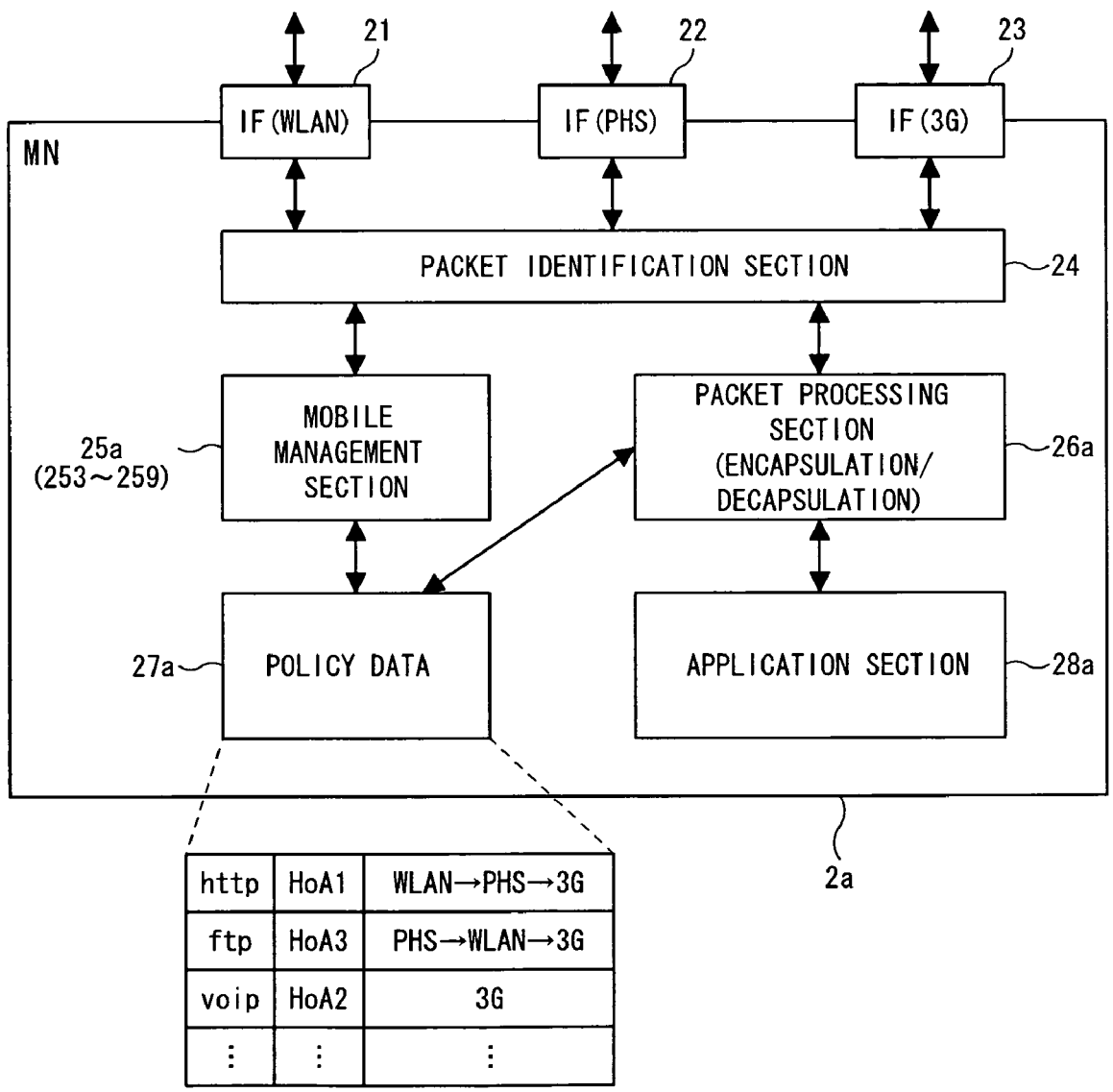
FIG. 21 is a functional block diagram showing the configuration of a mobile node (MN) shown in FIG. 19.

For instance, in the embodiment shown in FIG. 21, when the MN 2a effects http communication as the policy data, the access lines (the interfaces 21, 22, and 23) are used in a priority sequence of the HoA1, a wireless LAN, a PHS, and a 3G. When ftp communication is effected, the access line is used in a priority sequence of the HoA3, a PHS, a wireless LAN, and a 3G. When voip communication is effected, data showing use of the HoA2 and the 3G access line (interface 23) are stored in the policy data memory 27a.

The packet processing section 26a has the function of encapsulating the received application data packet and passing the thus-encapsulated packet as data to the application section 28; as well as the function of encapsulating (packing into a packet) the transmission data generated by the application section 28, as required, and transmitting the encapsulated packet to the interface 21, 22, or 23. Here, the HoA to be used as the transmission source address of the packet transmitted from the application section 28 is determined by reference to the policy data in the policy data memory 27a. A transmission packet whose transmission source address is HoA is generated.

Even in the present embodiment, the CoA is generated by combination of, e.g., a network prefix portion (higher 64 bits) of the home address and interface IDs unique to the respective interfaces 21, 22, and 23.

By means of the above-described function, even in the present embodiment, the MN 2a can selectively use one of the interfaces 21, 22, and 23 (access lines) in accordance with the type of the application. For instance, when accessing the web server 4, the MN 2a requests the web server 4 to transmit a file through use of an HoA desired to be used for http communication. As a result, the web server 4 transmits a requested file to the HoA which is the destination and desired to be used by the MN 2a.

Operation of the mobile communications system of the second embodiment will be described in detail hereunder.

(B1) Description of Operation of HA

Figure 29:
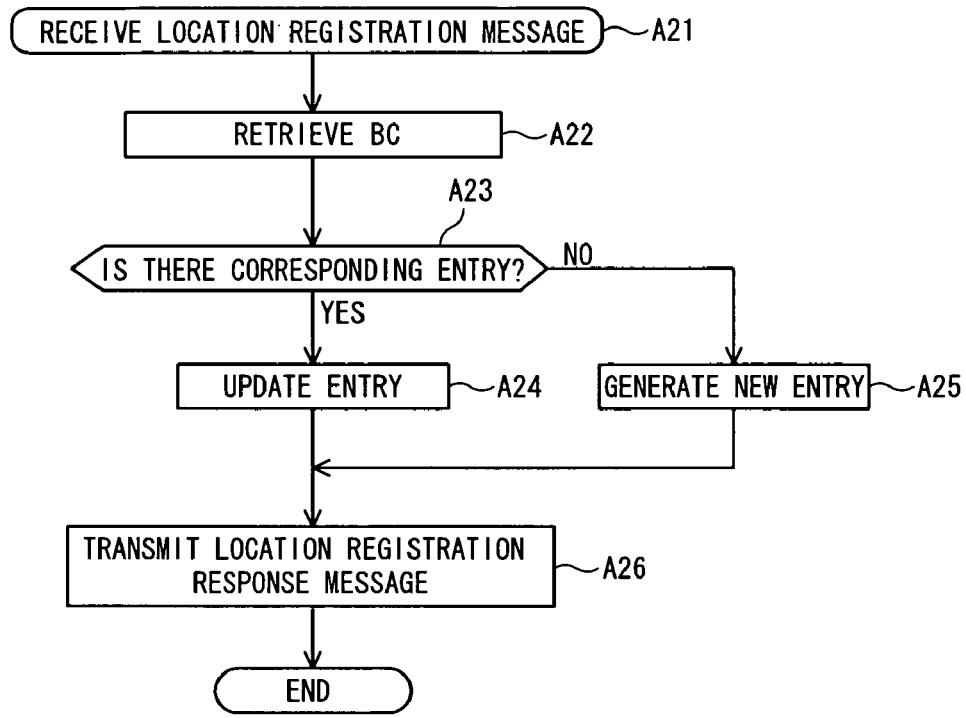
FIG. 29 is a flowchart for describing location registration message processing of an HA according to the second embodiment.
Figure 30:
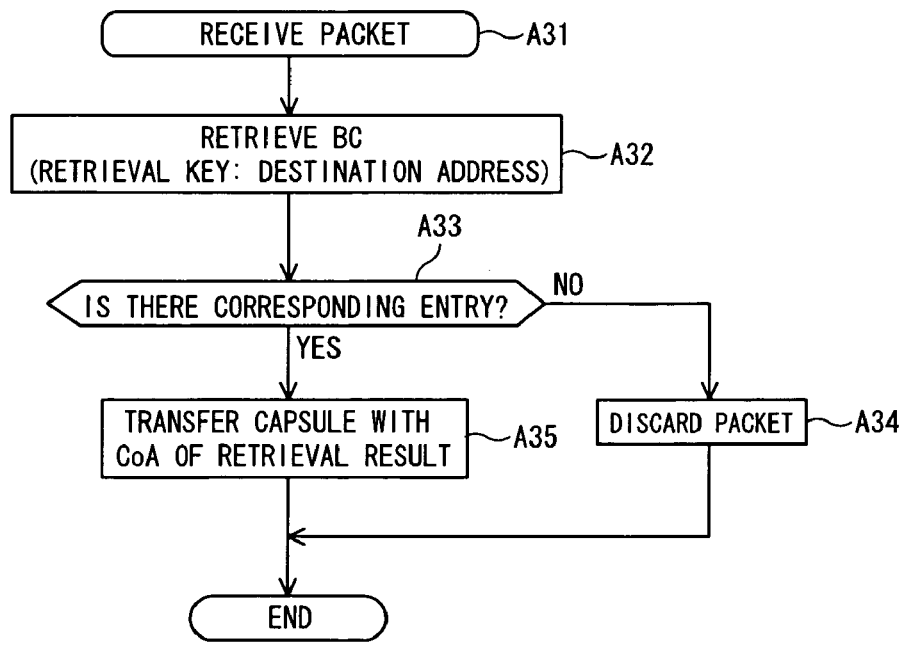
FIG. 30 is a flowchart for describing packet transfer processing of the HA according to the second embodiment.

First, operation of the HA 1a will be described by reference to flowcharts shown in FIGS. 29 and 30. FIG. 29 shows location registration message processing, and FIG. 30 shows packet transfer processing.

(B1-1) Location Registration Message Processing

As shown in FIG. 29, when the HA 1a has received a location registration message from the MN 2a by means of the message processing section 13 (step A21), the message processing section 13 retrieves a corresponding entry (a set consisting of an HoA and a CoA) of the location information cache 11a on the basis of specifics of the location registration message (step A22). If no entry is found, the entry is newly registered (a route from NO in step A23 to step A25). If the entry is found, the specifics of the entry are updated (a route from YES in step A23 to step A24).

Subsequently, the HA 1a (the message processing section 13) generates, in response to the location registration message, a location registration response message which is addressed to the MN 2a and which indicates completion of location registration. The HA 1a then transmits the location registration response message by way of the packet transfer section 15 (step A26).

(B1-2) Packet Transfer Processing

In the meantime, as shown in FIG. 30, when the HA 1a has received the packet addressed to the MN 2a (step A31), the packet processing section 14 retrieves the location information cache 11a while taking the destination address of the received packet as a retrieval key (step A32). If a corresponding entry is not found, the received packet is discarded (or transmitted to the home link without being encapsulated) (a route from NO in step A33 to step A34). In contrast, when the corresponding entry is found, the received packet is encapsulated with the CoA of the entry, and the thus-encapsulated packet is transferred by way of the packet transfer section 15 (a route from YES in step A33 to step A35).

(B2) Description of Operation of the MN

Figure 31:
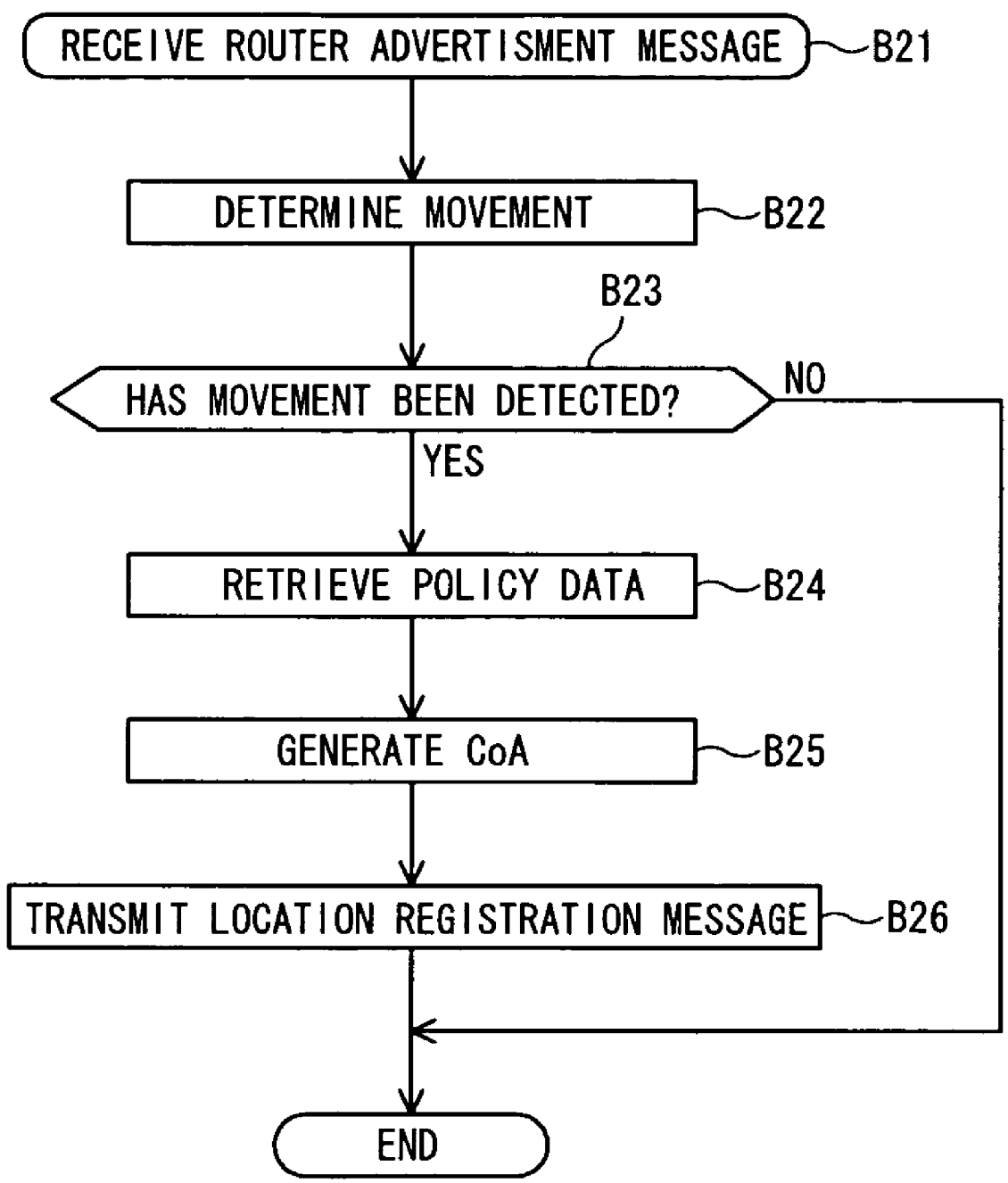
FIG. 31 is a flowchart for describing location registration message transmission processing performed during movement of an MN of the second embodiment.

Next, operation of the MN 2a will be described by reference to a flowchart shown in FIG. 31. FIG. 31 is location registration message transmission processing to be performed during movement, and the processing shown in FIG. 31 is performed for each of the interfaces 21, 22, and 23.

When the MN 2a has received a router advertisement message from the nearest AR 3 (step B21), the mobility management section 25a ascertains whether or not a prefix portion of a local link included in the router advertisement message is different from a prefix portion of the router advertisement message that has been received thus far, thereby determining whether or not the MN 2a has moved to a link subordinate to another AR 3 (steps B22, B23).

Consequently, when movement of the MN 2a is detected, the mobility management section 25a retrieves policy data in the policy data memory 27a (a route from YES in step B23 to step B24), thereby determining which HoA is used for communication of the application.

In the embodiment shown in FIG. 21, as a result of retrieval of policy data, there is received information indicating that the HoA1 is used for http communication, the HoA3 is used for ftp communication, and the HoA2 is used for voip communication; that, in connection with http communication, the wireless LAN card 21 is used with the first priority level, the PHS card 22 is used with the second priority level, and the 3G card is used with the third priority level; that, in connection with ftp communication, the PHS card 22 is used with the first priority level, the wireless LAN card 21 is used with the second priority level, and the 3G card is used with the third priority level; and that, in connection with voip, the 3G card 23 is used with the first priority level (other cards are not used), the PHS card 22 is used with the second priority level, and the 3G card is used with the third priority level. Hence, when the MN 2a has moved to the area where a wireless LAN is available, the mobility management section 25a is understood to use the HoA1 and the wireless LAN card 21 for http communication but not for voip communication.

Therefore, when performing location registration in the area of the wireless LAN, the mobility management section 25a generates a CoA1 corresponding to the wireless LAN card 21 (step B25), and transmits the CoA1 while the CoA1 is included in the location registration message addressed to the HA 1a (step B26). When movement of the MN 2a has not been detected, generation/transmission of the location registration message is not performed, and the mobility management section enters a standby condition until the next router advertisement message is received (when NO is selected in step B23).

(B3) Description of Operation of Overall System

Example operation of the overall system will now be described on premise of operation of the previously-described HA 1a and that of the previously-described MN 2a, by reference to FIGS. 22 through 28.

Figure 22:
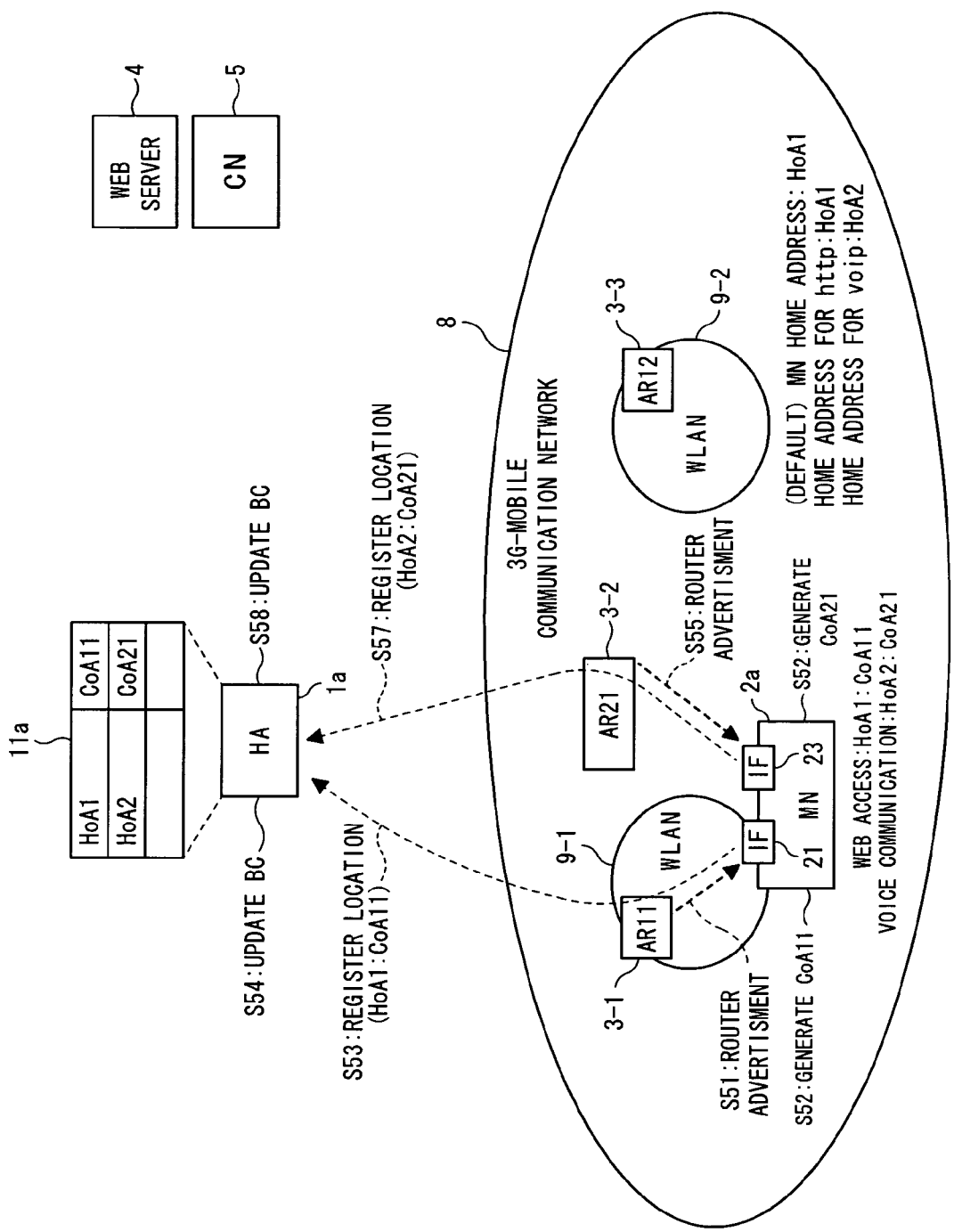
FIG. 22 is a view for describing operation (an application handover) of the mobile communications system of the second embodiment.

First, as shown in FIG. 22, two wireless-LAN areas 9-1, 9-2 exist in the 3G mobile communications network 8. Even in this case, the MN 2a can access the 3G mobile communications network 8 by way of an AR 3-2 (a router number 21), the wireless LAN 9-1 by way of an AR 3-1 (a router number 12), and the wireless LAN 9-2 by way of an AR 3-3 (a router number 12). The MN 2a is equipped with the interfaces 21 and 23. The interface 21 is assumed to be a wireless LAN card, and the interface 23 is assumed to be a 3G card.

The MN 2a can determine the types of the interface cards 21 and 22, and grasps which one of the interfaces 21, 22, and 23 is to be used for each application. The two home addresses HoA1 and HoA2 are assigned to the MN 2a. The HoA1 is used as a default for an access to a web (http communication); the HoA2 is used as a default for voice call (voip communication); and the HoA1 is used as a default for other communication.

As mentioned by reference to FIG. 21, the MN 2a receives a router advertisement message periodically transmitted by the AR 3-1 by means of the wireless LAN card 21 (step S51), confirms specifics of the message (presence/absence of a change in the prefix), and determines whether or not the MN 2a has moved to a local link subordinate to another AR 3. When movement of the MN 2a is confirmed, the MN 2a refers to/retrieves the policy data by means of the mobility management section 25a.

Since the wireless LAN card 21 is now registered as a first priority in the policy data, the mobility management section 25a determines the wireless LAN card 21 and the HoA1 as an interface and the HoA, which are to be used; generates a CoA (CoA11) corresponding to the wireless LAN card 21 (step S52); generates a location registration message including the HoA1 while taking the CoA11 as the address of the transmission source; and transmits the thus-generated location registration message to the HA 1a (step S53).

Figure 23:
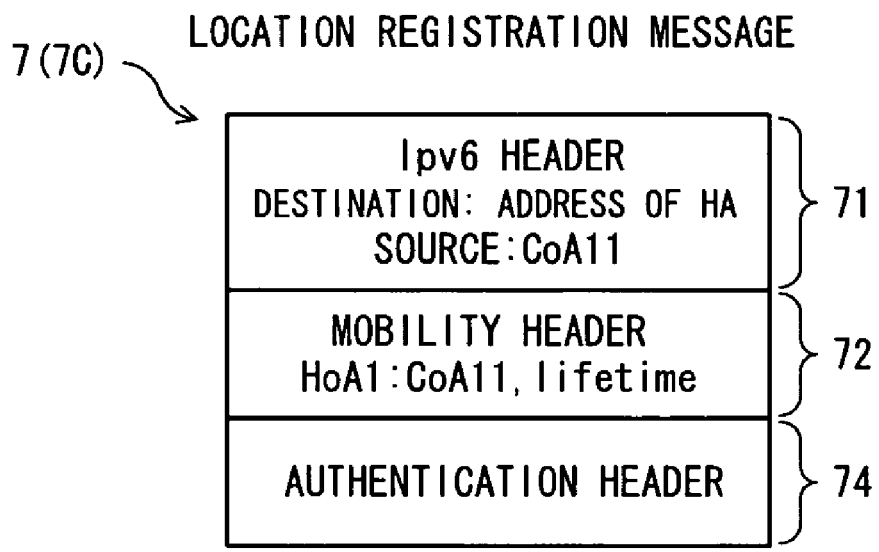
FIGS. 23 and 24 are views showing an example of a location registration message employed in the second embodiment.
Figure 24:
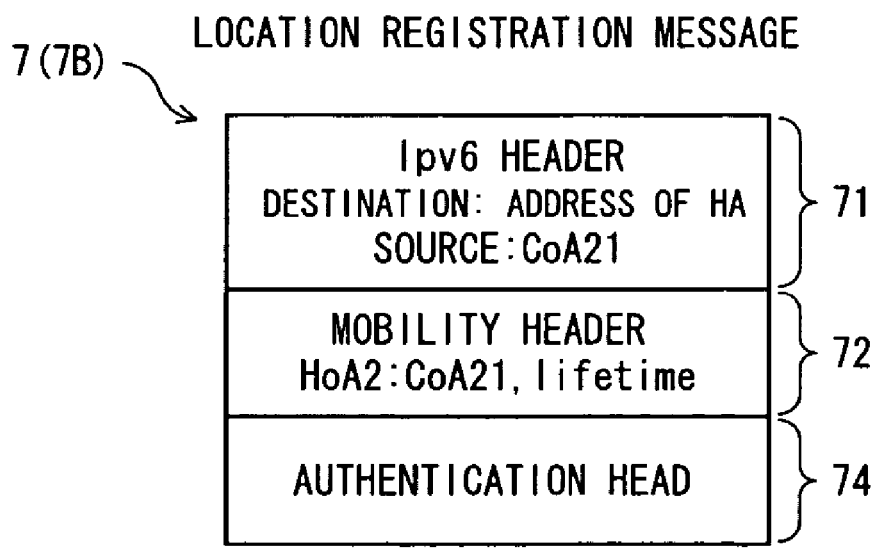

Specifically, as shown in, e.g., FIG. 23, the mobility management section 25a sets the address of the HA 1a as a destination address of the IPv6 header 71 and the CoA11 as the address of a transmission source. The mobility management section 25a causes the mobility header 72 to include the HoA1 and the CoA11 and generates a location registration message 7 (7C) addressed to the HA 1. When the HA 1a has received the location registration message 7C, the message processing section 13 registers/updates the data (entry) into the location information cache 11a of the HA 1a in accordance with specifics of the message (step S54).

When the MN 2a is situated in the area subordinate to the AR 3-2 of the 3G mobile communications network 8, the MN 2a can also receive the router advertisement message from the AR 3-2 by means of the 3G card 23 (step S55). In this case, location registration processing for the 3G card 23 is performed in the same manner independently of (in parallel with) location registration processing for the wireless LAN card 21.

More specifically, the mobility management section 25a generates a CoA21 for the 3G card 23 (step S56). As shown in, e.g., FIG. 24, the address of the HA 1 is set as the destination address of the IPv6 header 71, and the CoA21 is set as the address of the transmission source. The Hoa2 and the CoA21 are included in the mobility header 72, and the location registration message 7 (7D) addressed to the HA 1a is generated and transmitted (step S57). In the HA 1a, the message processing section 13 registers/updates the data (entry) in the location information cache 11a of the HA 1a in accordance with specifics of the location registration message 7D (step S58).

Figure 25:
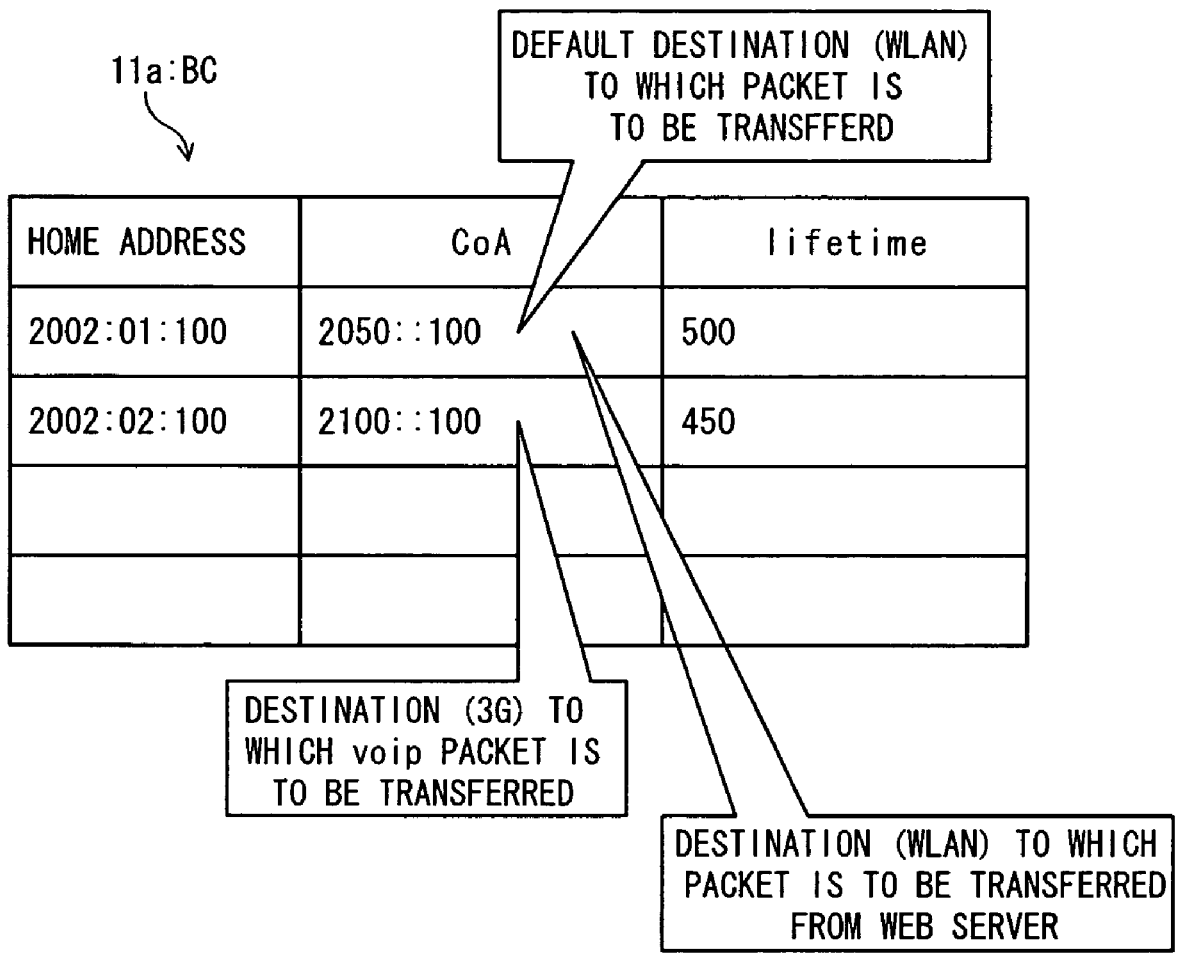
FIG. 25 is a view showing example registration of a location information cache of the second embodiment.

Thus, the HA 1a generates the location information cache 11a. FIG. 25 shows example registration of the location information cache 11a. As shown in FIG. 25, a set of pieces of information consisting of the home address (HoA) of the MN 2, the CoA, a lifetime (sec.), etc., is registered in the location information cache 11a. In FIG. 25, a set for http communication consisting of HoA1=2002:01::100, CoA11=2050::100, and lifetime=500 (sec.) is registered as a first entry of the default transfer destination (wireless LAN). A set for voip communication consisting of HoA2=2002:02::100, CoA21=2100::100, lifetime=450 (sec.) is registered as a second entry.

Figure 26:
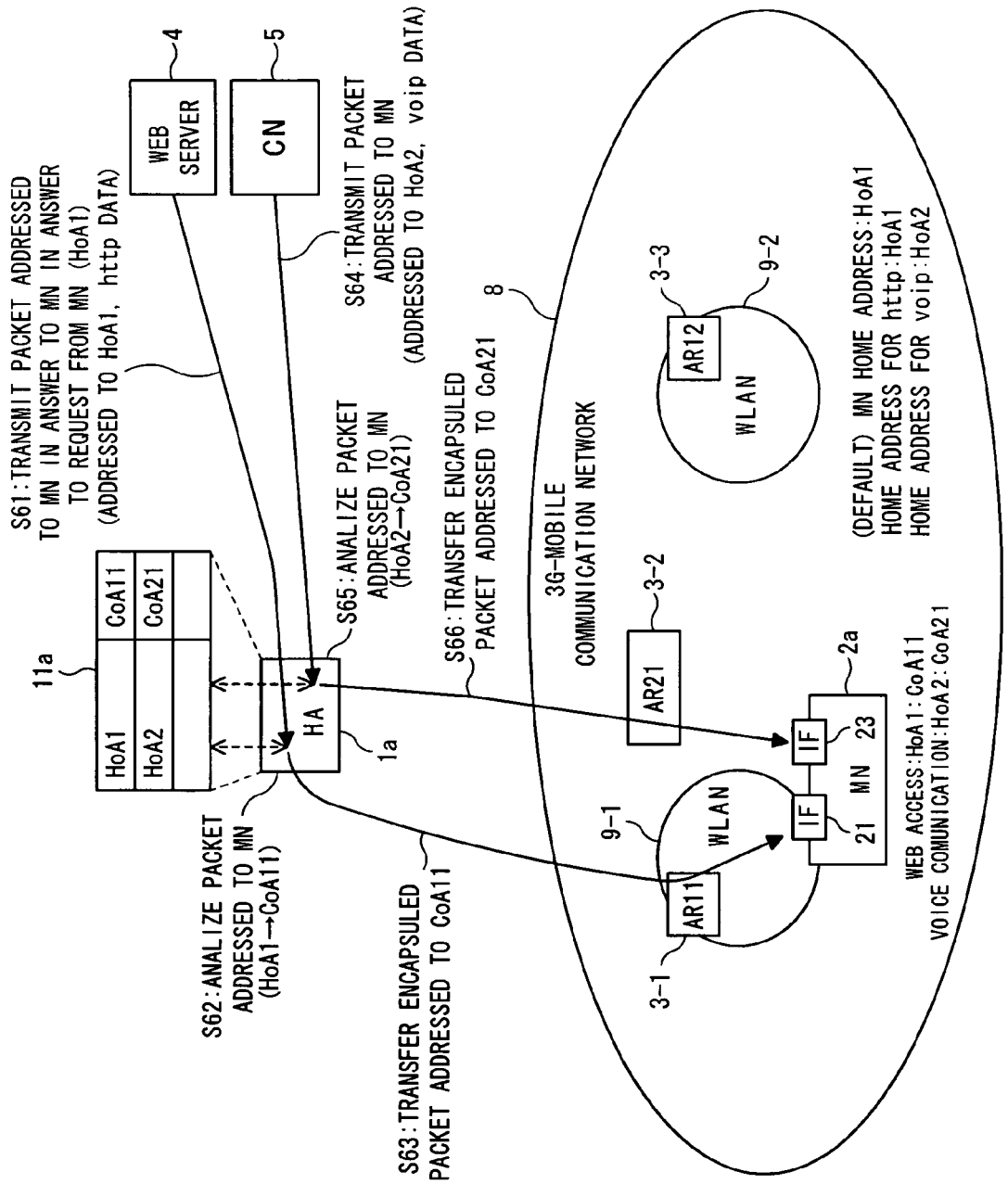
FIGS. 26 to 28 are views for describing operation (an application handover) of the mobile communications system of the second embodiment.

Operation for transferring the packet from the HA 1a to the MN 2a after the location registration processing has been completed as mentioned above will now be described by reference to FIG. 26. As shown in FIG. 26, when the MN 2a has requested data from the web server 4, the web server 4 transmits a packet (http packet) addressed to the home address (HoA1) of the MN 2a in response to the request (step S61). The home address (HoA1) is the home link address of the HA 1a, and hence the packet is delivered to the home link of the HA 1a. The HA 1a intercepts the packet.

At this time, the HA 1a retrieves the location information cache 11a by means of the packet identification section 12 and the packet processing section 14 while taking the transmission source address (HoA1) of the received packet as a retrieval key, thereby acquiring CoA11 as a destination address of the MN 2a (step S62). The original packet received from the web server 4 is encapsulated by the packet processing section 14 and transmitted to the CoA11 as a destination (step S63). Here, the CoA11 is the CoA used for the link subordinate to the AR 3-1. Therefore, this packet (http data) is delivered to the MN 2a by way of the link of the wireless LAN 9-1 and received by the wireless LAN card 21 of the MN 2a.

Similarly, the voip packet that is addressed to the HoA2 and has been transmitted from the CN 5 simultaneously with the http data is also intercepted by the HA 1a (step S64). The HA 1a retrieves the location information cache 11a while taking the HoA2 as a retrieval key, thereby acquiring a CoA21 as current information about the MN 2a (step S65).

The packet processing section 14 encapsulates the original packet (the voip packet) received from the CN 5, and transmits the thus-encapsulated packet to the CoA21 as a destination (step S66). The CoA21 is a CoA used for a link of the AR 3-2, and hence the voip packet is delivered to the MN 2a by way of the 3G mobile communications network 8, and is received by the 3G card 23 of the MN 2a.

As mentioned above, in the embodiment, the packet can be received by way of an access network desired by the MN 2a in accordance with an application in the same manner as in the first embodiment without making a significant functional addition to the HA 1a through use of a different HoA for each application.

Figure 27:
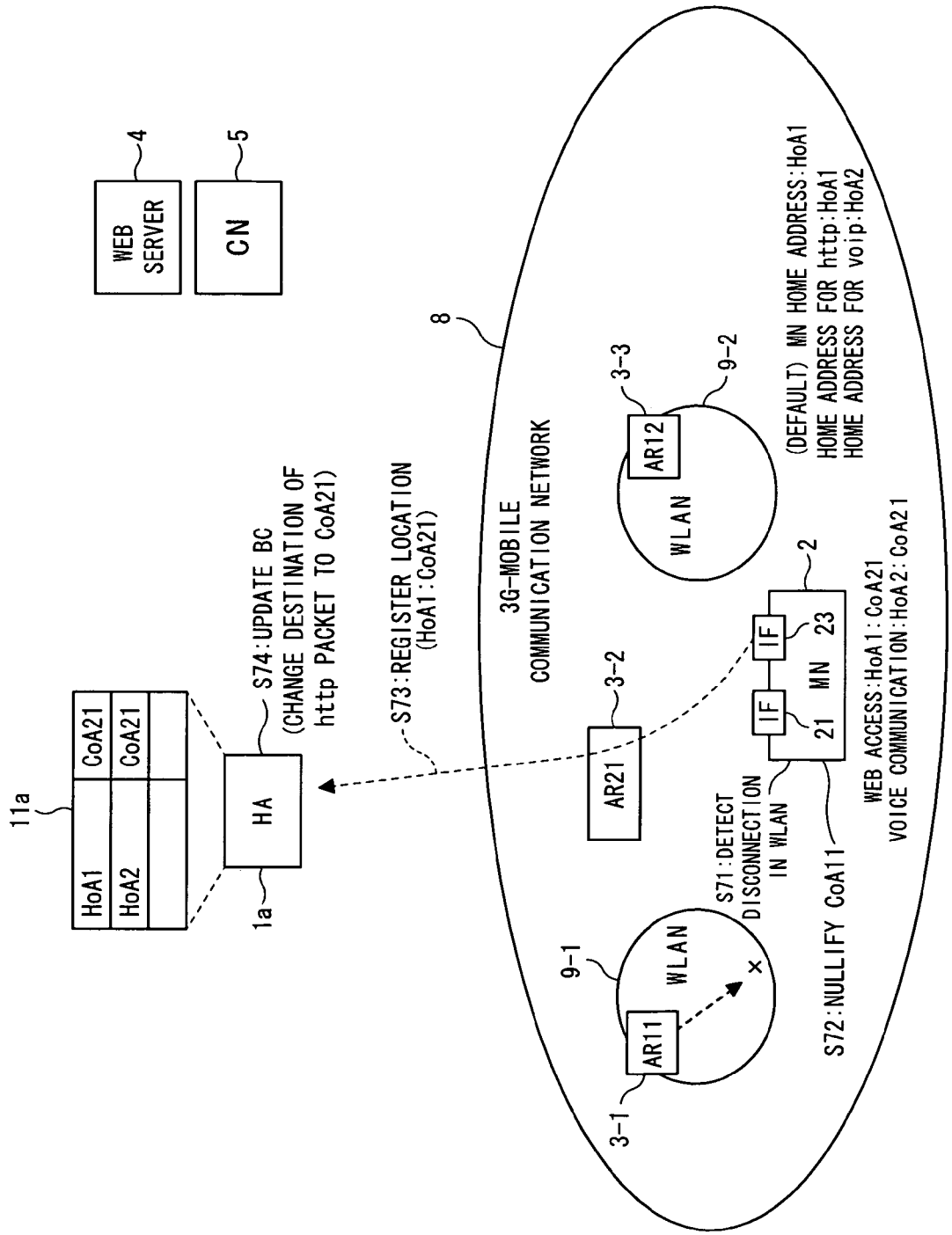

Next, the MN 2a is assumed to have moved from the location shown in FIG. 26 in a rightward direction of the paper as shown by FIG. 27 and moved out of the area of the wireless LAN 9-1. In this case, when the mobility management section 25a detects from, e.g., information about the intensity of a received radio wave, that the link of the wireless LAN 9-1 is already unavailable for the MN 2a, by way of the wireless LAN card 21 (step S71), the CoA11 assigned to the wireless LAN card 21 cannot be used. Therefore, there is performed processing for changing (handing over) the route for receiving the http packet from the web server 4 from the wireless LAN 9-1 to the 3G mobile communications network 8.

Specifically, the MN 2a (the mobility management section 25a) nulls the CoA11 (step S72); determines the 3G having the priority level next to the wireless LAN as an access line by reference to the policy data; and changes the transfer destination of the http packet to the effective CoA21 used by the 3G mobile communications network 8 by means of the location registration message 7 addressed to the HA 1a (steps S73, S74). Thus, the MN 2a sequentially selects an optimum access network from among the access networks that are available at that point in time, and uses the selected access network.

Figure 28:
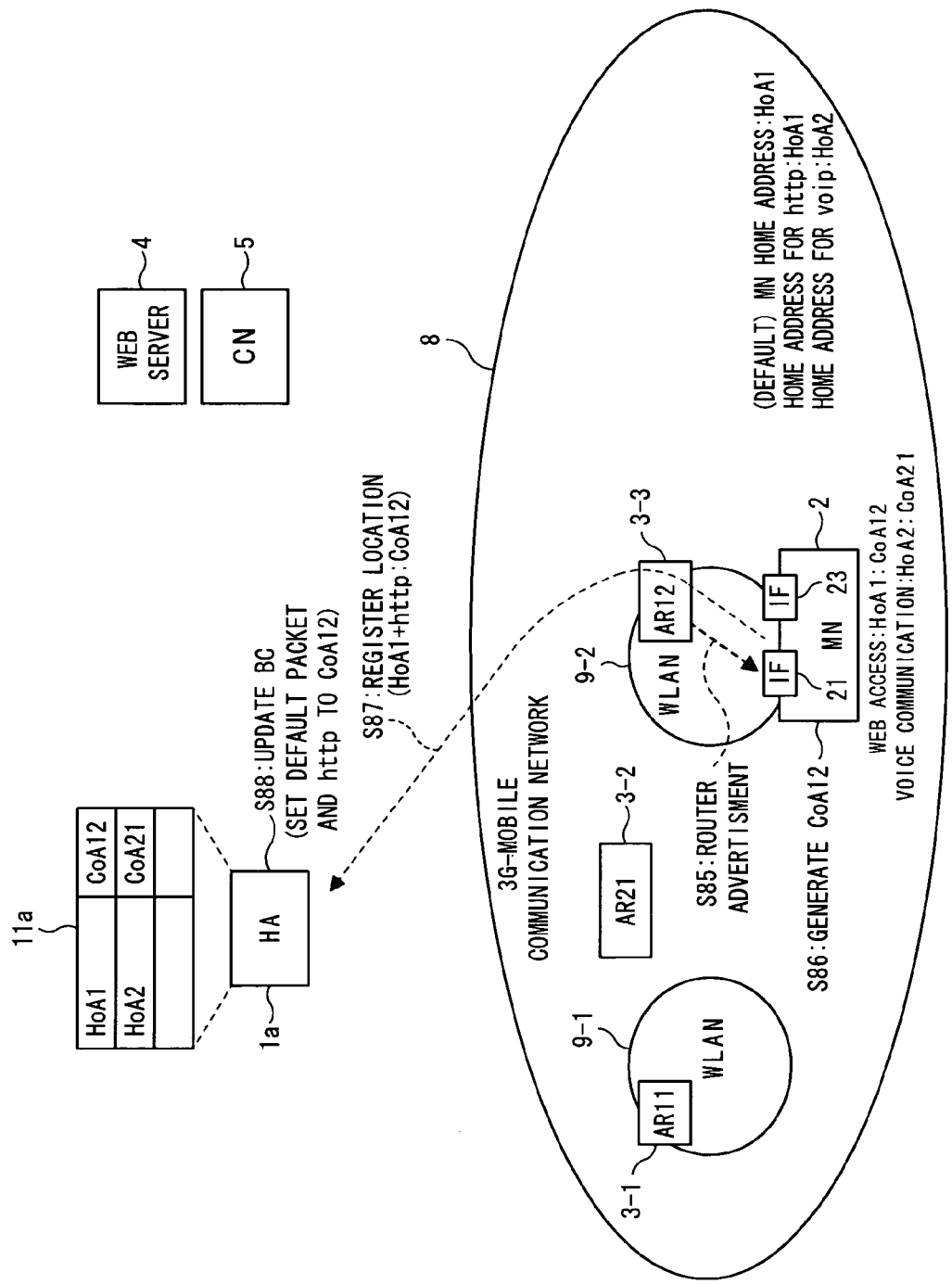

As shown in FIG. 28, the MN 2a is assumed to have entered the area of another wireless LAN 9-2 as a result of having moved further in the rightward direction of the paper. The MN 2a (the mobility management section 25a) receives the router advertisement message periodically transmitted from the AR 3-3 (step S85); detects movement of the MN 2a in the manner mentioned previously; newly generates a CoA12 for the wireless LAN card 21 (step S86); and registers the CoA12 into the location information cache 11a of the HA1a by means of the location registration message 7 so as to assign the CoA12 to the HoA1 (steps S87, S88).

Even in the present embodiment, all or some of the policy data may be registered in the HA 1a or another server or the like in advance.

(B4) Description of a First Modification

In the above-described embodiment, the CN 5 always transmits, to the link (HA 1a) of the home address of the MN 2a, the packet addressed to the MN 2a. However, if the route optimization function of the Mobile-IPv6 is applied as in the case of the first embodiment, the packet can be transmitted directly to the MN 2a while bypassing the HA 1a. At this time, if the CoA desired by the MN 2a for receiving a packet is reported from the MN 2a to the CN 5, an access line to be used for receiving a packet can be specified after receipt of the packet; that is, after initiation of communication.

Figure 32:
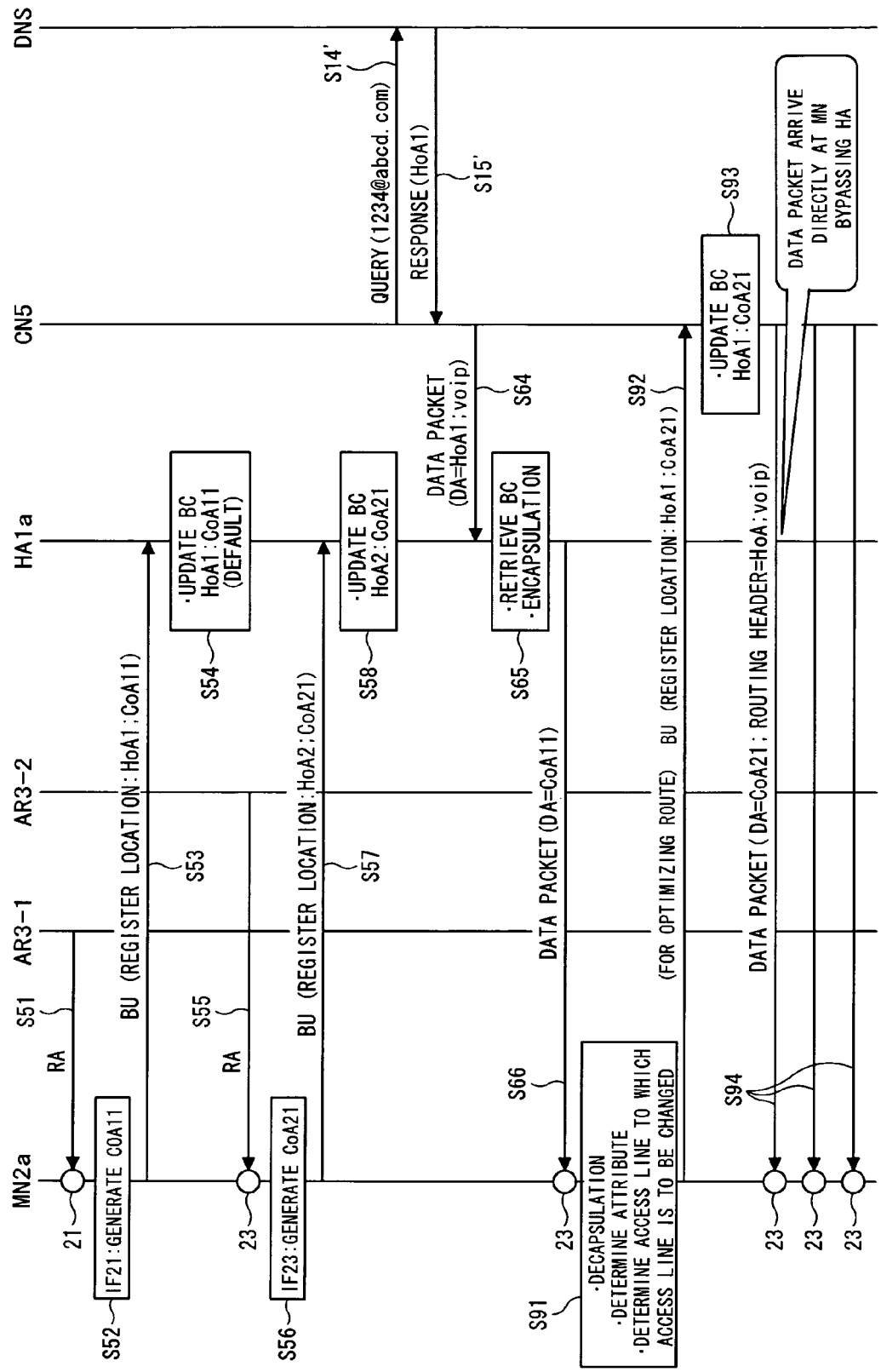
FIG. 32 is a sequence diagram for describing operation (route optimization) of the mobile communications system employed as a first modification of the second embodiment.

Such an operation will be described hereinbelow by reference to a sequence diagram shown in FIG. 32. In FIG. 32, unless otherwise specified, operations pertaining to steps S51 to S58, S64, S65, and S66 are the same as or analogous to those described by reference to FIGS. 22 and 26.

At the start of communication with the MN 2a, the CN 5 sends an inquiry about the home address (HoA1) of the MN 2a to a DNS (Domain Name System) or the like (query transmission), to thus acquire the home address of the MN 2a (steps S14', S15'), and transmits the packet to the thus-acquired home address (step S64). As mentioned previously, the packet is encapsulated by the HA 1a (step S65) and transmitted to the MN 2 (step S66).

When the MN 2a has received the packet (voip packet) of the CN 5 encapsulated and transmitted by the HA 1a, the data attribute of the received packet is identified while receipt of the packet is taken as a trigger. Subsequently, an access line by way of which a packet of that attribute is desired to be received is determined (step S91), and the access line is reported to the CN 5 by means of the location registration message for optimizing a route.

For instance, when the MN 2a desires to receive a packet from the CN 5 by way of the access line of the 3G mobile communications network 8 by means of the 3G card 23, the MN 2a transmits the HoA1 and the CoA21 to the CN 5 while the HoA1 and the CoA21 are included in the location registration message for optimizing a route (steps S91, S92).

Upon receipt of the above-described location registration message, the CN 5 registers/updates the HoA1 and the CoA21 included in the message in the location information cache (omitted from the drawings) which is managed by itself like the location information cache in the HA 1a (step S93). Subsequent data packets addressed to the MN 2a are directly transmitted to the CoA21 rather than to the home address (bypassing HA 1a)(step S94).

As mentioned above, even in this embodiment, the MN 2a determines the data attribute of the packet while taking receipt (arrival) of the packet from the CN 5 as a trigger, and address information (CoA) about a desired access line corresponding to the data attribute is reported to the CN 5. As a result, the CN 5 having received the report can change the destination of subsequent transmission packets to the access line reported by the MN 2a.

(B5) Description of a Second Modification

Figure 33:
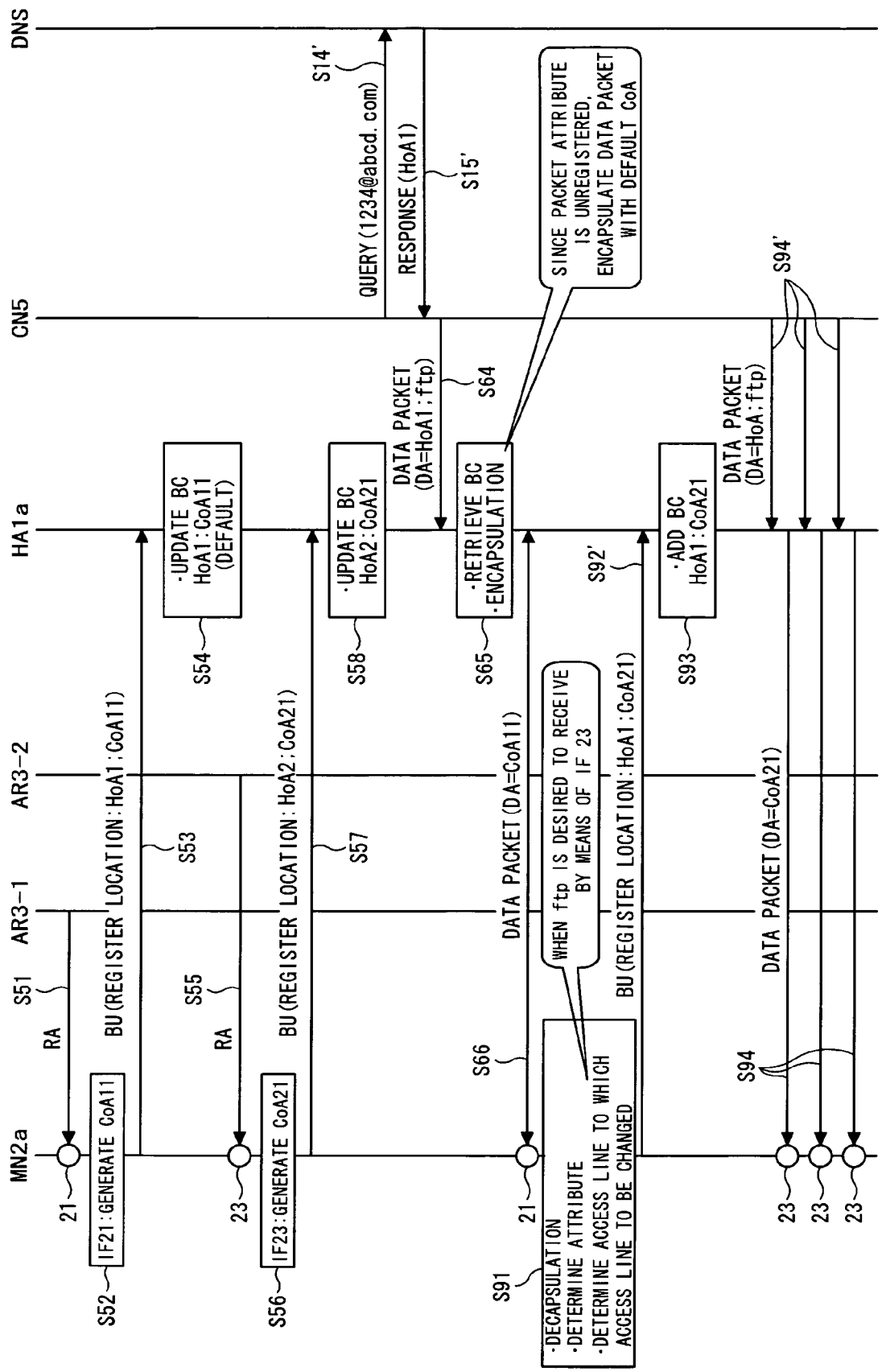
FIG. 33 is a sequence diagram for describing operation (specification of an access line after initiation of communication) of the mobile communications system employed as a second modification of the second embodiment.

Another example operation for specifying an access line used by the MN 2a for receiving a packet after initiation of communication between the MN 2a and the CN 5 will be described by reference to a sequence diagram shown in FIG. 33. In FIG. 33, unless otherwise specified, operations pertaining to steps S51 to S58, S64 to S66, S14', and S15' are the same as or analogous to those described by reference to FIGS. 22, 26, and 32.

First, in this case, the CN 5 is assumed to have transmitted the data packet to the MN 2a by means of ftp (step S64). In this case, since the CoA concerning the data attribute (ftp) has not yet been registered in the location information cache 11a, the HA 1 encapsulates the received packet with the CoA (CoA11) of the default transfer destination, and transfers the thus-encapsulated packet to the MN 2 (step S16). As a result, the MN 2a receives the ftp packet from the CN 5 by way of the wireless LAN by means of the wireless LAN card 21.

In the MN 2a, the packet identification section 24 identifies the data attribute (ftp) of the received packet while taking receipt of the packet as a trigger (the address of the CN 5 is also determined at this time by reference to the address of the transmission source of the received packet). The route changing section 254 reports, to the CN 5, an access line by way of which the packet of the data attribute is desired to be received, by means of a location registration message for optimizing a route.

For example, when the packet is desired to be received from the CN 5 by way of the access line of the 3G mobile communications network 8 by means of the 3G card 23, the MN 2a transmits the CoA21 while the CoA21 is included in the location registration message addressed to the HA 1a (steps S91, S92').

Upon receipt of the location registration message, the HA 1a registers (adds) a set consisting of the HoA1 and the CoA21, both being included in the message, into the location information cache 11a (step S93). Subsequent data packets addressed to the MN 2a which are received from the CN5 (step S94') are encapsulated with the CoA21, and the thus-encapsulated packets are transferred to the MN 2a (step S94).

As mentioned above, in the present modification, the MN 2a determines the data attribute of the packet while taking receipt of the packet from the CN 5 as a trigger, and reports to the HA 1 the address information (HoA, CoA) about a desired access line corresponding to the data attribute, so that the HA 1a having received the report can change a destination to which subsequent data are to be transferred, in accordance with specifics of the report.

(B6) Description of a Third Modification

Figure 34:
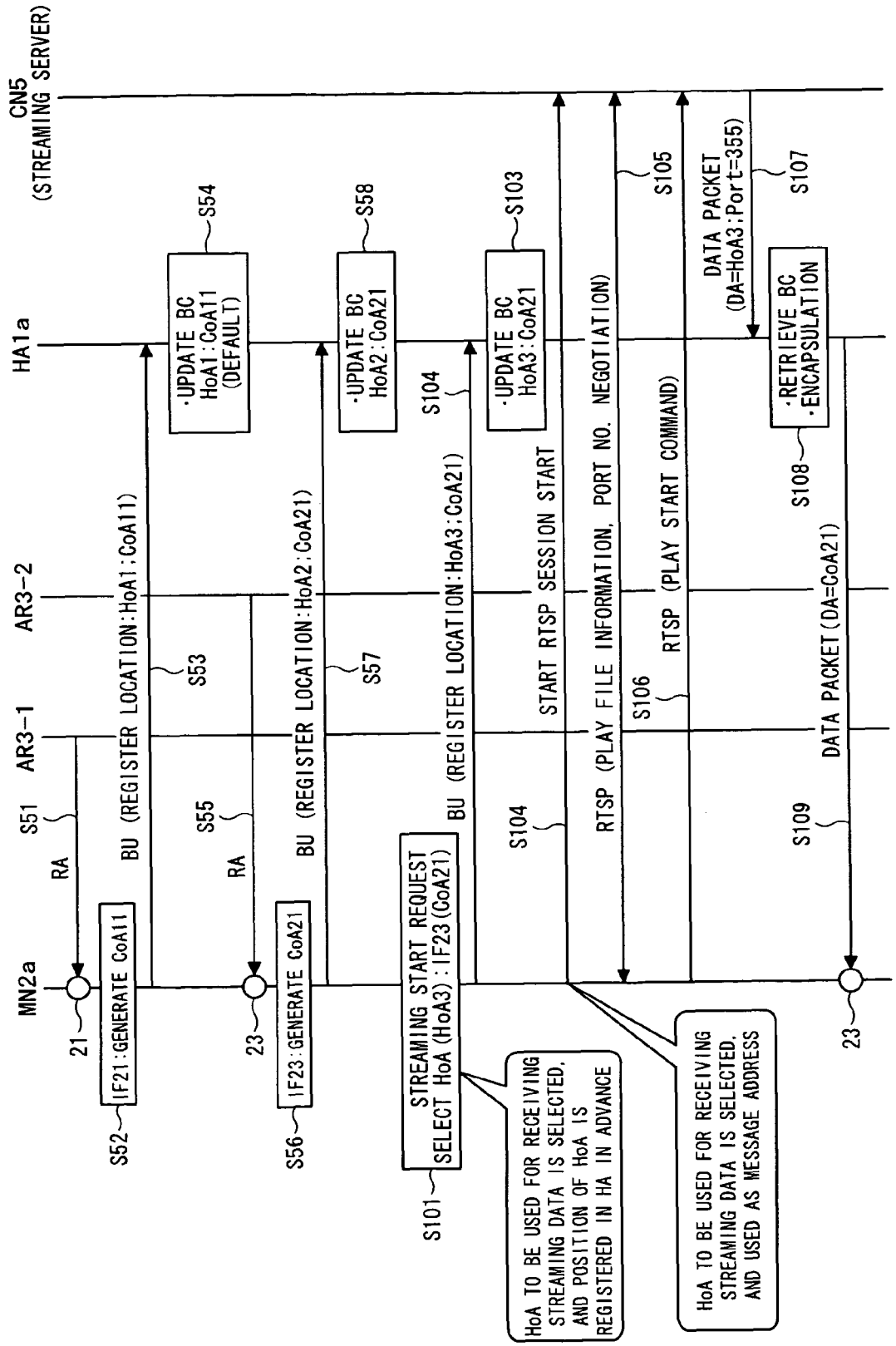
FIG. 34 is a sequence diagram for describing operation (streaming service) of a mobile communications system employed as a third modification of the second embodiment.
Figure 35:
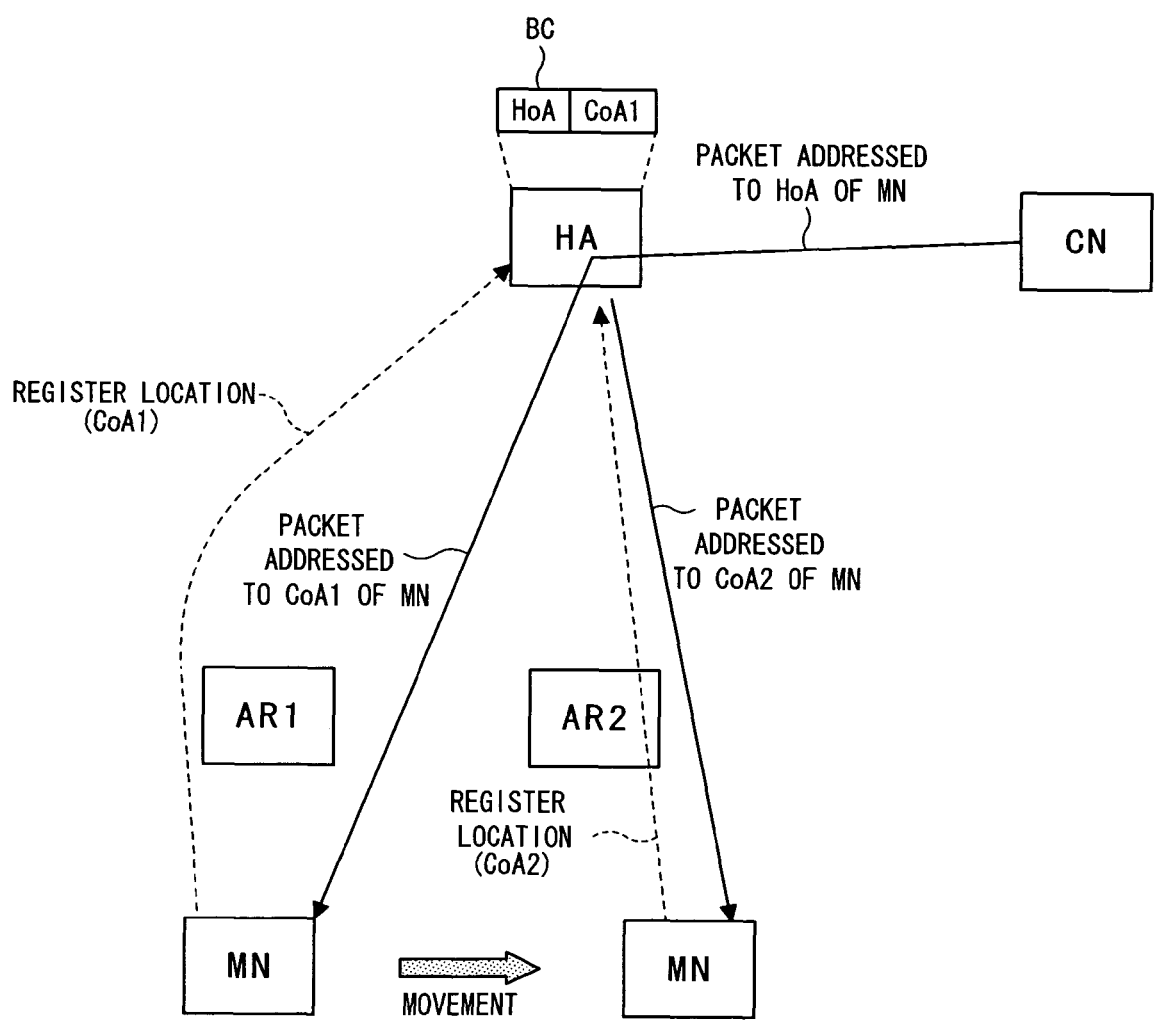
FIGS. 35 and 36 are views for describing a conventional communications method using mobile IPs.
Figure 36:
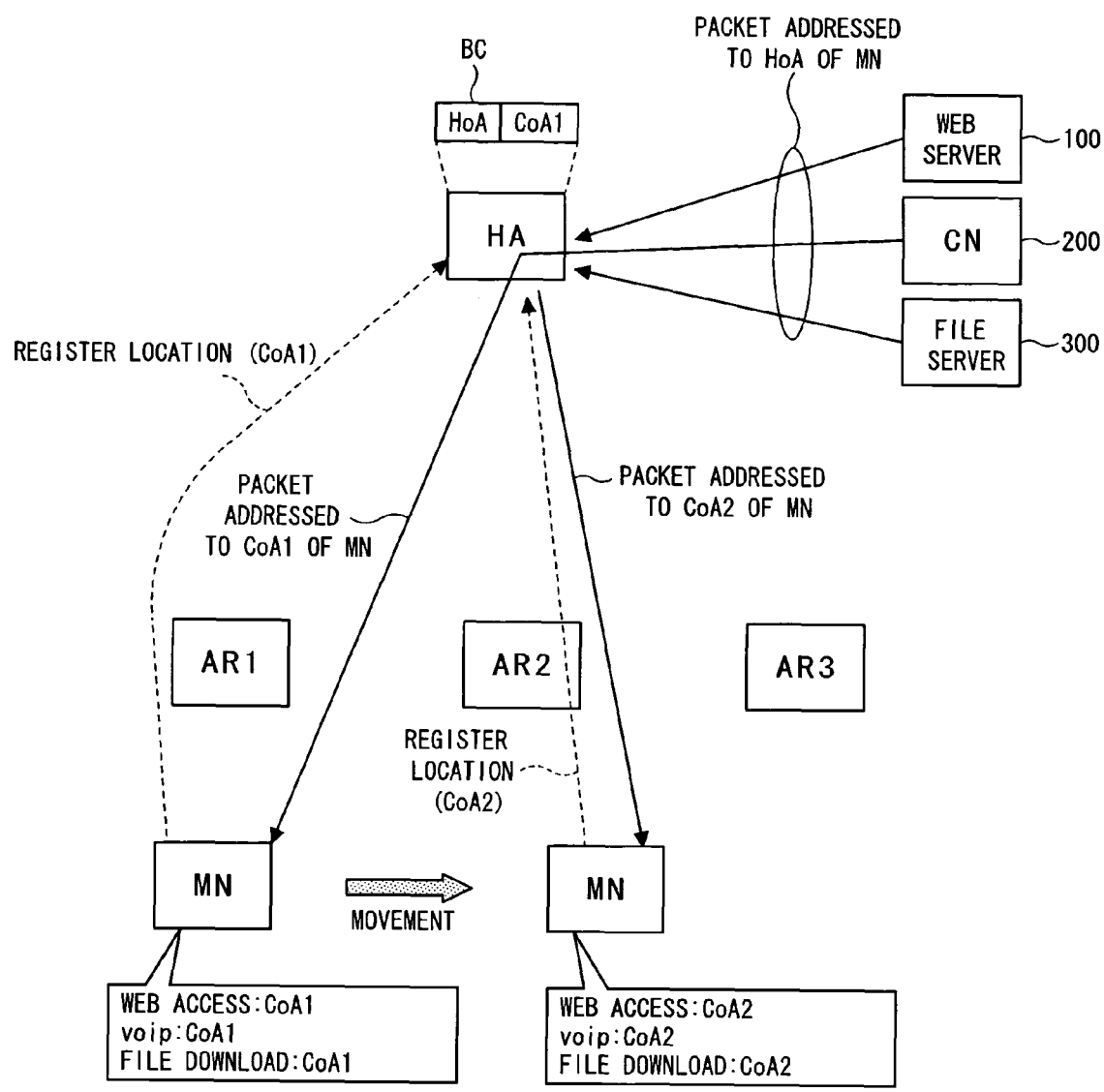

Next will be described an example operation performed when the MN 2a accesses a streaming server acting as the CN 5 to receive a streaming service, by reference to a sequence diagram shown in FIG. 34. In FIG. 34, operations pertaining to steps S51 to S58 are also the same as or analogous to those described by reference to FIGS. 22 and 26, unless otherwise specified.

In this case, the MN 2a selects the HoA (HoA3) used for receiving streaming data, and registers the HoA3 and the CoA21 corresponding to the HoA3 in the HA 1a by means of the location registration message 7 (steps S101, S102, and S103). Subsequently, the MN 2a starts a session with the streaming server and the RTSP by means of using the HoA3 as a transmission (source) address of the transmission message from the MN 2a (step S104), and performs negotiation for required information (play file information, a port number, or the like) by means of RTSP (step S105), to thus acquire a port number=355.

The MN 2a transmits a play start command to the streaming server 5 by means of RTSP (step S106), and the streaming serer 5 having received the play start command transmits the data packet to the home address (HoA3) of the MN 2a with the port number=355 (step S107). The data packet is received by the HA 1a, and the HA 1a retrieves the location information cache 11a while taking the HoA (HoA3) of the received packet as a key, to thus acquire the CoA21. The received packet is encapsulated with the CoA21, and the thus-encapsulated packet is transferred. As a result, the packet is received by the 3G card 23 of the MN 2a by way of the access line of the 3G mobile communications network 8 (steps S108, S109).

(C) Advantages

As has been described above, according to the embodiments, an appropriate access line can be selected from a plurality of access lines connected simultaneously to an MN in accordance with the request (policy data) from the MN and the type of an application such as http, ftp, voip, or the like. Hence, an optimum access line corresponding to the type of an access line can be selected, and a packet can be transferred. Consequently, the quality desired by the user of the MN is ensured, and an attempt can be made to effectively utilize a network.

As a result, for instance, there can be realized a way of receiving advertisement information by way of only a wireless LAN line which does not incur much communication cost and simultaneously to exchange data through use of a PHS line which ensures data quality.

In another example, an employee of a certain company is assumed to be supplied with a 3G card admitted solely for business use and to personally own a PHS card. Under a situation where a personal computer (PC) set in his/her home can use the 3G card supplied from the company and the personal PHS card, when an access is made to a WEB for personal use by means of the home PC, the employee uses the personal PHS card. However, receipt of mails is also always performed for business purpose by the home PC. There is a conceivable application of use of only the 3G card for checking a mail. Even in the case of such an application, the user can use an appropriate access line according to an application without becoming aware of selection of various access lines, by means of settings of the policy data.

In addition, example uses provided below are also conceivable by means of setting of the policy data.

A certain user uses the 3G line because interruption of a voice during communication is troublesome. When the user views a motion picture, the user drops in at a service area to download a video file without interruption. If data become deficient during movement, the user uses the 3G line as well.

A low-speed (a narrow band) line is used for receiving ordinary mails. When contents are displayed by accessing an URL attached to one of the mails, display of the contents by way of the low-speed line involves consumption of much time. Hence, the 3G line, which is a high-speed (a wide band) line, is used. If a much faster wireless LAN line is available, the wireless LAN is used.

When the user has a contract for a fixed-price PHS service, a PHS line, which is most stable and provides clear sound quality, is used for voice communication. In the case of other http communication or the like, a line having the largest margin of the band in an area of interest is used.

A secure line other than the wireless LAN is used for delivering materials, such as a cost estimate or proposed materials for a client, which should not be revealed to competitors, and the wireless LAN is used for other communication.

The wireless LAN is used for browsing catalogues. However, when personal information, such as a credit number or the like, is transmitted during on-line shopping, the 3G line having a high concealing characteristic is used.

Unapproved advertisements are received by way of solely a line which does not incur much cost.

The highly-reliable 3G line or PDC line is used for communication with an emergency call, such as a 911 emergency call, or conversation between members of the police.

The highly-reliable 3G line or PDC line is used for offering a remote medical service, such as a remote surgical operation.

(D) Others

Needless to say, the present invention is not limited to the embodiments set forth and can be implemented while being modified in various manners without departing from the scope of the invention.

For example, the function of the HA may be imparted to an edge node, and the edge node may determine a transfer destination of a received packet (encapsulate the received packet or the like).

As has been described in detail, according to the present invention, an appropriate access line can be selected from a plurality of access lines connected simultaneously to a mobile node according the type of an application such as http, ftp, voip, or the like. Hence, the quality required by the user of the mobile node is ensured, and an attempt can be made to effectively utilize a network. Thus, the invention is considered to be extremely useful in the field of mobile communication.

What is claimed is:

1. An application data transfer method for use in a mobile communications system, the system having a mobile node which enables simultaneous communication with a plurality of communication nodes when simultaneously connected to a plurality of access lines, and a mobility management node that manages a path for transferring data to said mobile node, the application data transfer method comprising:

selecting an access line to be used for transferring application data, on the basis of the type of said application data to be transferred from said communication node to said mobile node; and transferring said application data by means of said selected access line, wherein said mobility management node identifies the type of said application data upon receipt of said application data addressed to said mobile node and selects said access line on the basis of a result of identification, and wherein said mobility management node is a node having a home agent function complying with a mobile IP, and said mobile node is a node having a client function complying with said mobile IP.

2. The application data transfer method for use in a mobile communications system according to claim 1, wherein said mobile node reports, to said mobility management node and according to an access line available in a current location, a correlation between information about the type of application data desired to be received by said access line and transfer destination address information for specifying said access line; and said mobility management node selects said access line on the basis of said correlation reported from said mobile node and said result of identification.

3. The application data transfer method for use in a mobile communications system according to claim 2, wherein said mobile node generates, as said transfer destination address information and according to the type of said application data, line address information about an access line used for receiving said application data in response to a single mobile node identifier assigned by said mobility management node; and reports a set of said line address information and said information about the type of application data to said mobility management node.

4. The application data transfer method for use in a mobile communications system according to claim 3, wherein, after having adjusted information about the type of application data by means of which communication is about to be established with said communication node, said mobile node reports a set of said information about the type of said application and said line address information to said mobility management node.

5. The application data transfer method for use in a mobile communications system according to claim 3, wherein said mobile node identifies the type of said application data upon receipt of said application data from said communication node, and posts transfer destination address information corresponding to a result of identification to said communication node; and said communication node transmits subsequent application data addressed to said mobile node to said transfer destination address information posted from said mobile node.

6. The application data transfer method for use in a mobile communications system according to claim 2, wherein said mobile node assigns, as said transfer destination address information, a plurality of mobile node identifiers according to the type of said application data; generates, as said transfer destination address information, line address information about an access line used for receiving said application data; and reports a set of said mobile node identifier and said line address information to said mobility management node.

7. The application data transfer method for use in a mobile communications system according to claim 6, wherein, after having adjusted information about the type of application data by means of which communication is about to be established with said communication node, said mobile node selects a mobile node identifier corresponding to said type information and reports a set of said mobile node identifier and said line address information to said mobility management node.

8. The application data transfer method for use in a mobile communications system according to claim 6, wherein said mobile node identifies the type of said application data upon receipt of said application data from said communication node, and posts transfer destination address information corresponding to a result of identification to said communication node; and said communication node transmits subsequent application data addressed to said mobile node to said transfer destination address information posted from said mobile node.

9. The application data transfer method for use in a mobile communications system according to claim 1, wherein, when having failed to identify the type of received application data addressed to said mobile node, said mobility management node selects a previously-set default access line from said access lines.

10. A mobility management node used in a mobile communications system, the system having a mobile node which enables simultaneous communication with a plurality of communication nodes when simultaneously connected to a plurality of access lines, the mobility management node comprising:

a data type identification unit that identifies the type of application data to be transferred from said communication node to said mobile node; and an access line selection unit that selects an access line used for transferring said application data, on the basis of a result of identification performed by said data type identification unit, wherein said mobility management node is a node having a home agent function complying with a mobile IP, and said mobile node is a node having a client function complying with said mobile IP.

11. The mobility management node used in a mobile communications system according to claim 10, wherein said access line selection unit comprises:

an address information management unit that manages a correspondence between information about the type of said application data and transfer destination address information for specifying an access line used for transferring said application data; and a data transfer processing unit that determines said transfer destination address information on the basis of said correspondence managed by said address information management unit and a result of identification made by said data type identification unit and which transfers application data addressed to said mobile node from said communication node to said transfer destination address information.

12. The mobility management node used in a mobile communications system according to claim 11, wherein said address information management unit has a location information cache for retaining a correspondence between information about the type of application data desired to be received by said access line and transfer destination address information for specifying said access line, said correspondence being reported from said mobile node according to an access line which is available for said mobile node in a current location.

13. The mobility management node used in a mobile communications system according to claim 12, wherein said location information cache is configured to retain, as the correspondence, a set of address information about an access line used for receiving the application data generated by the mobile node in accordance with the type of the application data in response to a single mobile node identifier and information about the type of the application data reported by mobile node along with the address information.

14. The mobility management node used in a mobile communications system according to claim 10, wherein
said access line selection unit has a default line selection unit that selects a previously-set default access line when said data type identification unit has failed to identify the type of received application data addressed to said mobile node.

15. A mobile node used in a mobile communications system, the system having said mobile node which enables simultaneous communication with a plurality of communication nodes when simultaneously connected to a plurality of access lines, and a mobility management node that manages a path for transferring data to said mobile node, the mobile node comprising:
a plurality of line interfaces corresponding to said plurality of access lines; and
a mobility management unit that reports, to said mobility management node according to the type of an access line available in a current location, a correspondence between information about the type of application data received by a line interface corresponding to said access line and transfer destination address information for specifying said access line, wherein
said mobility management node is a node having a home agent function complying with a mobile IP, and said mobile node is a node having a client function complying with said mobile IP.

16. The mobile node used in a mobile communications system according to claim 15, wherein
said mobility management unit is configured by comprising:
an application-specific line address information generation unit that generates line address information about an access line used for receiving said application data according to the type of said application data in response to a single mobile node identifier assigned by said mobility management node; and
a first transfer destination address information reporting unit that that reports to said mobility management node a set of said line address information and said information about the type of said application data.

17. The mobile node used in a mobile communications system according to claim 15, wherein
said mobility management unit has
an application-specific node identifier generation unit that assigns a plurality of mobile node identifiers according to the type of said application data and which generates, as said transfer destination address information, line address information about an access line used for receiving said application data; and
a second transfer destination address information reporting unit that reports to said mobility management node a set of said mobile node identifier and said line address information.

18. The mobile node used in a mobile communications system according to claim 15, further comprising a data type identification unit that identifies the type of application data upon receipt of said application data from said mobility management node, wherein
said mobility management unit is configured by comprising a first transfer destination address information designation unit that reports to said communication node transfer destination address information corresponding to a result of identification performed by said data type identification unit such that said communication node transmits, to said transfer destination address information, subsequent application data addressed to said mobile node.

19. The mobile node used in a mobile communications system according to claim 15, further comprising:
a data type identification unit that identifies the type of application data upon receipt of said application data from said mobility management node by way of said line interface; and wherein
said mobility management unit is configured by comprising a second transfer destination address information designation unit that reports, to said mobility management node, transfer destination address information corresponding to a result of identification performed by said data type identification unit such that said mobility management node transmits, to said transfer destination address information, subsequent application data received from said communication node.

20. An application data transfer method for use in a mobile communications system, the system having a mobile node which enables simultaneous communication with a plurality of communication nodes when simultaneously connected to a plurality of access lines, and a mobility management node that manages a path for transferring data to said mobile node, the application data transfer method comprising:
selecting an access line to be used for transferring application data, on the basis of the type of said application data to be transferred from said communication node to said mobile node; and
transferring said application data by means of said selected access line, wherein said mobility management node identifies the type of said application data upon receipt of said application data addressed to said mobile node and selects said access line on the basis of a result of identification, and wherein
when having failed to identify the type of received application data addressed to said mobile node, said mobility management node selects a previously-set default access line from said access lines.

* * * * *